United States Patent [19]

Engeler

[11] Patent Number: 5,151,970

[45] Date of Patent: Sep. 29, 1992

[54] METHOD OF GENERATING, IN THE ANALOG REGIME, WEIGHTED SUMMATIONS OF DIGITAL SIGNALS

[75] Inventor: William E. Engeler, Scotia, N.Y.

[73] Assignee: General Electric Company, Schenectady, N.Y.

[21] Appl. No.: 722,801

[22] Filed: Jun. 28, 1991

Related U.S. Application Data

[62] Division of Ser. No. 546,970, Jul. 2, 1990.

[51] Int. Cl.$^5$ .......................... G06F 7/52; G06F 15/40
[52] U.S. Cl. ........................................ 395/24; 364/807
[58] Field of Search ............................ 364/807; 395/24

[56] References Cited

U.S. PATENT DOCUMENTS

| | | | |
|---|---|---|---|
| 3,950,733 | 4/1979 | Cooper et al. | 364/900 |
| 4,156,284 | 5/1979 | Engeler | 364/841 |
| 4,199,817 | 4/1980 | Conkling et al. | 364/602 |
| 4,288,858 | 9/1981 | Merola et al. | 364/826 |
| 4,491,930 | 1/1985 | Hyatt | 364/726 |
| 4,910,700 | 3/1990 | Hartley et al. | 364/759 |
| 4,972,473 | 11/1990 | Ejiri et al. | 364/513 |
| 5,039,870 | 8/1991 | Engeler | 364/807 |

OTHER PUBLICATIONS

"VLSI Technologies for Artificial Neural Networks", Goser et al, IEEE Micro, 1989.
"Programmable Analog Synapses for Microelectronic Neural Networks Using a Hybrid Digital-Analog Approach", Kub et al, IEEE Inter. Conf. on Neural Networks, Jul. 1988.
"Digital-Analog-Hybrid Neural Simulator: A Design-aid for Custom-VLSI Neurochips", Moopenn et al, SPIE vol. 1058 High speed Computing II (1989).
"Programmable Analog Vector-Matrix Multipliers", Kub et al, IEEE Journal of Solid State Electronics vol. 23, No. 1, Feb. 1990.
"Electronic Artificial Neural Networks", Sage et al, IEEE Int. Conf. on Systems, Man and Cybernetics 1987.
"A Preprogrammed Artificial Neural Network Architecture in Signal Processing"Bloomer et al, Proceeding of IEEE 1990 Custom Integrated Circuits Conf., May 13–16, 1990.
"A Reconfigurable Analog VLSI Neural Network Chip", Graf et al, IEEE Conf. on Neural Network System, Nov. 27–30, 1989.
"Design of Parallel Hardware Neural Network Systems from Custom Analog VLSI 'Building Block' Chips", Eberhardt et al, IJCNN, Jun. 18–22, 1989.

Primary Examiner—Michael R. Fleming
Assistant Examiner—George Davis
Attorney, Agent, or Firm—Allen L. Limberg; James C. Davis, Jr.; Marvin Snyder

[57] ABSTRACT

A method is disclosed for operating electronic apparatus for generating a weighted summation of digital input signals as manifested in electric signal form, each sample of which digital input signals has a plurality B in number of bits identified by respective ones of consecutive ordinal numbers first through $B^{th}$ assigned in order of decreasing significance. Successive samples of each of the digital input signals is supplied in a respective stream, such that the respective streams of samples are parallel in time with each other. Each B-bit sample of said digital input signals is recoded into a plurality D in number of binary-coded digits, as manifested in electric signal form and as identified by consecutive ordinal numbers frist through $D^{th}$ assigned in order of decreasing significance of the respective weighting assigned each of the D binary-coded digits, B and D begin respectively a relatively larger positive integer and a relatively smaller positive integer. Each set of temporally aligned digits is converted to a set of corresponding analog electric signals, consisting of D subsets each containing analog electric signals corresponding to digits of the same assigned weighting. A weighted summation procedure is performed on the streams of partial weighted summation results, thereby to obtain a stream of final weighted summation results as manifested in electric signal form.

8 Claims, 19 Drawing Sheets

METHOD OF GENERATING, IN THE ANALOG REGIME, WEIGHTED SUMMATIONS OF DIGITAL SIGNALS

This is a division of U.S. patent application Ser. No. 546,970 filed Jul. 2, 1990.

The invention relates to the operation of analog computer structures and, more particularly, to operating such analog computer structures for use with digital electronic circuits using plural-bit digital signals.

BACKGROUND OF THE INVENTION

Computers of the von Neumann type architecture have limited computational speed owing to the communication limitations of the single processor. These limitations can be overcome if a plurality of processors are utilized in the calculation and are operated at least partly in parallel. This alternative architecture, however, generally leads to difficulties associated with programming complexity. Therefore, it is often not a good solution. Recently, an entirely different alternative that does not require programming has shown promise. The networking ability of the neurons in the brain has served as a model for the formation of a highly interconnected set of analog processors, called a "neural network" or "neural net" that can provide computational and reasoning functions without the need of formal programming. The neural nets can learn the correct procedure by experience rather than being preprogrammed for performing the correct procedure. The reader is referred to R. P. Lippmann's article "An Introduction to Computing With Neural Nets" appearing on pages 4–21 of the April 1987 *IEEE ASSP MAGAZINE* (0740-7467/87/0400-0004/ $10.00" 1987 IEEE), incorporated herein by reference, for background concerning neural nets.

Neural nets are composed of a plurality of neuron models, analog processors each exhibiting "axon" output signal response to a plurality of "synapse" input signals. In a type of neural net called a "perceptron", each of these processors calculates the weighted sum of its "synapse" input signals, which are respectively weighted by respective weighting values that may be positive- or negative-valued, and responds non-linearly to the weighted sum to generate the "axon" output response. In the present-day development of the integrated electronic circuitry art, the weighted summation of a large number of terms, each of which has resolution that would require plural-bit digital sampling, can be done appreciably faster and at less cost in integrated circuit die area by processing in the analog regime rather than in the digital regime.

Using capacitors to perform weighted summation in accordance with Coulomb's Law provides neural nets of given size operating at given speed that consume less power than those the analog processors of which use resistors to implement weighted summation in accordance with Ohm's Law. Y. P. Tsividis and D. Anastassion in a letter "Switched-Capacitor Neural Networks" appearing in ELECTRONICS LETTERS, Aug. 27th, 1987, Vol. 23, No. 18, pages 958,959 (IEE) describe one method of implementing weighted summation in accordance with Coulomb's Law. Their method, a switched capacitor method, is useful in analog sampled-data neural net systems.

U.S. patent applications Ser. Nos. 366,838 and 366,839 filed Jun. 15, 1989 by W. E. Engeler, entitled respectively "NEURAL NET USING CAPACITIVE STRUCTURES CONNECTING INPUT LINES AND DIFFERENTIALLY SENSED OUTPUT LINE PAIRS" and "NEURAL NET USING CAPACITIVE STRUCTURES CONNECTING OUTPUT LINES AND DIFFERENTIALLY DRIVEN INPUT LINE PAIRS", and assigned to General Electric Company describe methods of implementing weighted summation in accordance with Coulomb's Law that do not rely on capacitances being switched and avoid the complexity of the capacitor switching elements and associated control lines.

U.S. patent application Ser. No. 366,838 entitled "NEURAL NET USING CAPACITIVE STRUCTURES CONNECTING INPUT LINES AND DIFFERENTIALLY SENSED OUTPUT LINE PAIRS" describes a type of neural net in which each analog synapse input signal voltage drives a respective input line from a low source impedance. Each input line connects via a respective weighting capacitor to each of a plurality of output lines. The output lines are paired, with the capacitances of each pair of respective weighting capacitors connecting a pair of output lines to one of the input lines summing to a prescribed value. A respective pair of output lines is associated with each axonal output response to be supplied from the neural net, and the differential charge condition on each pair of output lines is sensed to generate a voltage that describes a weighted summation of the synapse input signals supplied to the neural net. A respective operational amplifier connected as a Miller integrator can be used for sensing the differential charge condition on each pair of output lines. Each weighted summation of the synapse input signals is then non-linearly processed in a circuit with sigmoidal transfer function to generate a respective axonal output response. This type of neural net is particularly well-suited for use where all input synapse signals are always of one polarity, since the single-polarity synapse input signals may range over the entire operating supply.

U.S. patent application Ser. No. 366,839 entitled "NEURAL NET USING CAPACITIVE STRUCTURES CONNECTING OUTPUT LINES AND DIFFERENTIALLY DRIVEN INPUT LINE PAIRS" describes a type of neural net in which each analog synapse input signal voltage is applied in push-pull from low source impedances to a respective pair of input lines. Each pair of input lines connect via respective ones of a respective pair of weighting capacitors to each of a plurality of output lines. The capacitances of each pair of respective weighting capacitors connecting a pair of input lines to one of the output lines sum to a prescribed value. Each output line is associated with a respective axonal output response to be supplied from the neural net, and the charge condition on each output line is sensed to generate a voltage that describes a weighted summation of the synapse input signals supplied to the neural net. A respective operational amplifier connected as a Miller integrator can be used for sensing the charge condition on each output line. Each weighted summation of the synapse input signals is then non-linearly processed in a circuit with sigmoidal transfer function to generate a respective axonal output response. This type of neural net is better suited for use where input synapse signals are sometimes positive in polarity and sometimes negative in polarity.

U.S. patent application Ser. No. 526,470, filed May 21, 1990 by W. E. Engeler, entitled "CAPACITIVE STRUCTURES FOR WEIGHTED SUMMATION, AS USED IN NEURAL NETS" and assigned to General Electric Company describes preferred constructions of pairs of weighting capacitors for neural net layers, wherein each pair of weighting capacitors has a prescribed differential capacitance value and is formed by selecting each of a set of component capacitive elements to one or the other of the pair of weighting capacitors. U.S. patent application Ser. No. 525,931, filed May 21, 1990 by W. E. Engeler, entitled "WEIGHTED SUMMATION CIRCUITS HAVING DIFFERENT-WEIGHT RANKS OF CAPACITIVE STRUCTURES" and assigned to General Electric Company describes how weighting capacitors can be constructed on a bit-sliced or binary-digit-sliced basis. These weighting capacitor construction techniques are applicable to neural nets that utilize digital input signals, as will be presently described, as well as being applicable to neural nets that utilize analog input signals.

The neural nets as thusfar described normally utilize analog input signals that may be sampled-data in nature. A paper by J. J. Bloomer, P. A. Frank and W. E. Engeler entitled "A Preprogrammed Artificial Neural Network Architecture in Signal Processing" published in December 1989 by the GE Research & Development Center describes the application of ternary samples as synapse input signals to neural network layers, which ternary samples can be generated responsive to single-bit digital samples.

Analog input signal samples are supplied to a neural net layer parallely in time. There is a class of problems that can usefully employ neural nets for their solution, but for which input signal samples are not available parallely in time. The paper "A Preprogrammed Artificial Neural Network Architecture in Signal Processing" describes the application of serially received analog samples to a plural-stage analog delay line to provide at the outputs of the stages the analog input signal samples supplied to a neural net layer parallely in time. The paper also describes the application of serially received digital samples to a serial-in/parallel out (SIPO) shift register, the outputs of the shift register stages determining the ternary samples applied in parallel as synapse input signals to neural network layers.

There is a class of problems that can usefully employ neural nets for their solution, but for which synapse input signal samples are plural-bit digital samples. Particularly where there are numerous plural-bit digital synapse input signal samples, difficulties are encountered in getting the plural-bit digital samples into the monolithic integrated circuit in which a neural net layer reposes, because of practical limitations on the number of pins available on the integrated circuit package. An example of when this type of problem is encountered is when one attempts to use a neural net to perform the two-dimensional spatial filtering associated with the recognition of shapes in video signals generated by raster scanning a focal plane array of photosensors in a video camera. In such two-dimensional spatial filtering it is desirable to provide for the temporary storage of the raster-scanned video signal samples, so that they may be temporally aligned for application to the neural net. In the present state of technology the temporary storage of a substantial number of video samples is most advantageously done in digital memory. The synapse input signals made available to the neural net from the digital memory are in digital, not analog, form.

The problem of the synapse input signals made available to a neural net being in plural-bit digital form rather than in analog form can arise in other contexts, too. In systems where the neural net layers are not located in proximity to each other the axon output response of a hidden neural net layer can be digitized in an analog-to-digital converter and transferred without error over substantial distances to another neural net layer. Using digital rather than analog signals to communicate between neural net layers can also be useful when back-propagation training algorithms are used to train a neural net, since it easier in the digital regime to alter the training algorithm in specified ways to take into account whether a new task is being learned or whether instead an old task is being modified to take into account a change in the operating environment.

SUMMARY OF THE INVENTION

The invention is embodied in a method for operating electronic apparatus for generating a weighted summation of digital input signals as manifested in electric signal form, each sample of which digital input signals has a plurality B in number of bits identified by respective ones of consecutive ordinal numbers first through $B^{th}$ assigned in order of decreasing significance. Successive samples of each of the digital input signals is supplied in a respective stream, such that the respective streams of samples are parallel in time with each other. Each B-bit sample of said digital input signals is recoded into a plurality D in number of binary-coded digits, as manifested in electric signal form and as identified by consecutive ordinal numbers first through $D^{th}$ assigned in order of decreasing significance of the respective weighting assigned each of the D binary-coded digits, B and D being respectively a relatively larger positive integer and a relatively smaller positive integer. Each set of temporally aligned digits is converted to a set of corresponding analog electric signals, consisting of D subsets each containing analog electric signals corresponding to digits of the same assigned weighting. A weighted summation procedure is performed on each of said D subsets of analog electric signals to obtain a respective partial weighted summation result manifested in electric signal form, thereby to generate a respective stream of partial weighted summation results as manifested in electric signal form. A weighted summation procedure is performed on the streams of partial weighted summation results, thereby to obtain a stream of final weighted summation results as manifested in electric signal form.

BRIEF DESCRIPTION OF THE DRAWING

Generally, the figures are schematic diagrams of various electronic systems which can be operated in accordance with the present invention.

In FIG. 11 the convention of using dashed lines to indicate control lines is used with regard to control lines for sample and hold circuits 97-99.

FIG. 20 is a schematic diagram of a Miller integrator with resetting circuitry that compensates for input offset error in the differential-input operation amplifier the Miller feedback capacitor provides degenerative feedback to.

DETAILED DESCRIPTION

Figure 1:
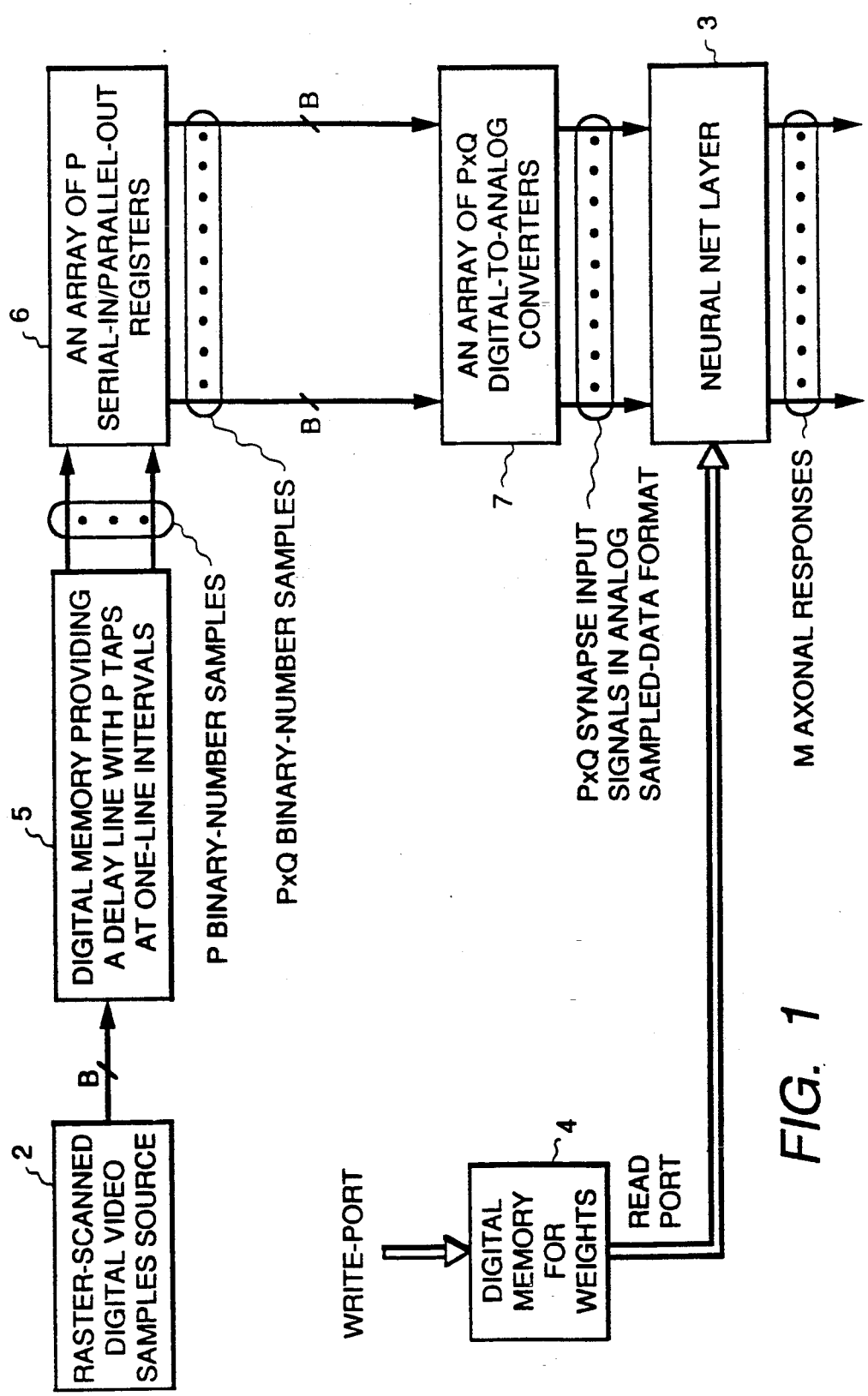
FIG. 1 is a schematic diagram of a system wherein: successive digital samples from a source of raster-scanned digital video samples are subjected to two-dimensional low-pass sinc filtering to generate parallel-in-time digital samples; the parallel-in-time digital samples are converted to sampled-data analog synapse input signals in respective ones of an array of digital-to-analog converters; and the analog synapse input signals are applied to a neural net layer to generate axonal responses.

In FIG. 1 a source 2 of raster-scanned digital video samples comprises, by way of example, a digital video tape playback system, a facsimile machine, or a video camera chain including an analog-to-digital converter for digitizing the analog output signal from the video camera. Successive digital samples describe respective picture elements, or pixels, along a succession of scan lines within a field of view. For the sake of simplicity, progressive scanning of the lines of a field will be presumed, although one skilled in the art of television system design will be enabled by this specification to design, without substantial difficulty, modifications of the circuitry to be described as will permit the use of interlaced scanning schemes. The raster-scanned digital video samples descriptive of a particular portion of a field have to be converted to sampled-data analog form and synchronized, or brought together in time so as to be simultaneously available, in order to be appropriate for application as synapse input signals to a neural net layer 3. The neural net layer 3, which responds to the synchronized analog synapse input signals to generate a number M of axonal responses, may be of one of the types described by W. E. Engeler in his-above-referenced patent applications.

In FIGS. 1, 4, 6 and 7 the neural net layer 3 is shown as being also of a type in which the weighting capacitors have their capacitances determined in accordance with respective weighting words stored in a digital memory 4. The digital memory 4 where used is preferably one the word storage locations of which are interstitially located within the neural net layer 3 on the same monolithic integrated circuit. Alternatively neural net layer 3 may be of a type having weighting capacitors with fixed values of capacitance, in which case the digital memory 4 for weights is dispensed with.

The synchronization of synapse input signal samples descriptive of a localized area of the field of view is most easily done using digital memory, when the samples are in digital form. The digital samples from a source 2 of raster-scanned digital video samples that is of one of the types described are generally parallel-bit in form, which is to say that all the bits of a digital sample are supplied parallelly in time, or synchronously. The number of bits in a sample may be one, as in a facsimile system, or from five to eight bits in an adjustable-iris video camera working in the visible light spectrum, or up to twelve bits or so in certain special types of video camera, such as those encountered in infrared video photography. Transverse filtering will be required to make digital video samples from different scan lines be available parallelly in time. Non-separable two-dimensional low-pass filtering to make simultaneously digital samples descriptive of an area of the field of view P samples "wide" by Q lines "high" is possible, where P and Q are respective numbers each greater than one, which numbers are often chosen to be the same as each other.

In such filtering all filter responses are unit-amplitude finite-impulse-response inside the passband and are zero-amplitude finite-impulse-response outside the passband. The terms "wide" and "high" are used, presuming that scan lines are horizontal, as is conventional in many systems; where scan lines are vertical or skewed, appropriate modifications should be made concerning those terms. In the frequency domain this type of filter has a low-pass response with sinc shapes in the direction of scan lines and in the transverse direction perpendicular to scan line direction, so will be referred to as sinc filtering. The sinc function is the damped sinusoid (sin x)/x in the x direction.

Non-separable sinc filtering can be accomplished using $P \times Q$ banks of digital serial memory and an appropriate multiplexer for permuting their respective data ports during a read-then-write operational cycle. Each bank of serial memory stores every $P^{th}$ pixel of a line in the field of view, so may be plural bits deep; and the serial memory in applications of this type is customarily emulated using random access memory.

Particularly when the number of bits per sample exceeds one requiring increased depth of memory, using non-separable two-dimensional sinc low-pass filtering to make the $P \times Q$ digital samples simultaneously available is not attractive when the number $P \times Q$ of digital samples becomes at all large. This is for the following reasons. Q lines of digital video storage memory is by itself a sizable portion of an integrated circuit, or i-c, and a neural net takes up a sizable portion of an i-c. So it is generally infeasible to place Q lines of digital video storage memory and a neural net within the same i-c. Placing the Q lines of digital video storage memory and the neural net within different integrated circuits means that the interconnections between the integrated circuits must transmit $P \times Q$ samples, each of which samples may be several bits in width.

To reduce the number of samples that must be transmitted from one i-c to another in a two-dimensional filtering process, it is usually preferable to do the initial two-dimensional sinc low-pass filtering separably, as shown in FIG. 1. A digital memory 5 performs sinc low-pass filtering in the transversal direction—i.e., the vertical direction, again presuming scan lines are horizontal. Digital memory 5, which provides a digital delay line with P tabs at one-line intervals, is of a type customarily emulated using P banks of random-access memory, each for storing a respective line of pixel samples. Digital memory 5, assumed to be located on a different i-c than the neural net 3, supplies only P samples to an array 6 of P serial-in/parallel-out registers assumed to be located on the same i-c as the neural net 3 and an array 7 of $P \times Q$ digital-to-analog converters used to supply analog synapse input signal data samples to the neural net 3. This is a Q-fold reduction of the number of samples that must be transmitted into the i-c in which the neural net 3 is located.

Even supplying P samples to the array 6 of P serial-in/parallel-out registers may entail an excessive number of ic-to-ic connections. This is especially likely where B, the number of bits in each of the digital video samples, is large.

Figure 2:
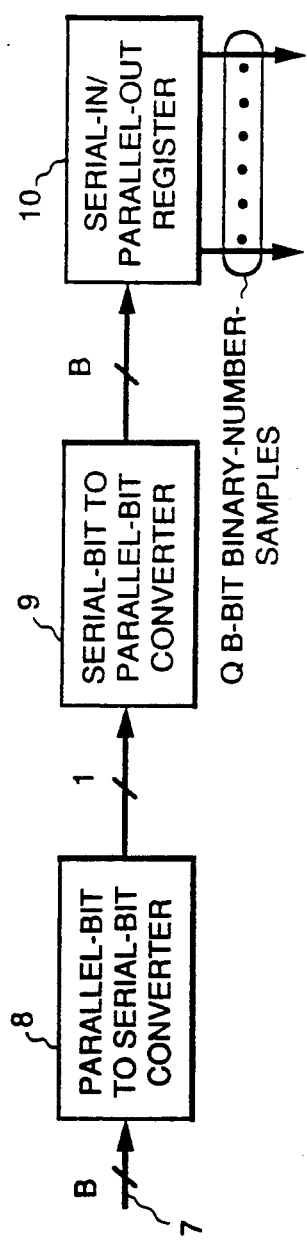
FIG. 2 is a schematic diagram of a modification of the FIG. 1 system.

FIG. 2 illustrates circuitry that can help solve this problem, particularly when data rates are not too high. It provides essentially a B-fold reduction of the number of ic-to-ic connections. The B parallel bits of each of the P samples to be supplied to the array 6 of P serial-in/parallel-out registers is converted to bit-serial form in a respective converter 8 located in the same integrated circuit as the tapped digital delay line memory 5. The serial bits respectively descriptive of each of the P samples supplied to the array 6 are converted back to parallel-bit form in a converter 9 located in the same integrated circuit as the array 6 of SIPO registers, the array 7 of DACs and the neural net 3. The B-bit-wide binary-number samples from converter 9 are applied to a serial-in/parallel-out register 10 that is one of the array 6 of P such registers. The reduction of the number of ic-to-ic connections may be one less than B-fold because of the need to provide synchronizing signal from one of the converters 8 and 9 to the other, to indicate where sample boundaries are in the serial bit streams.

Figure 3:
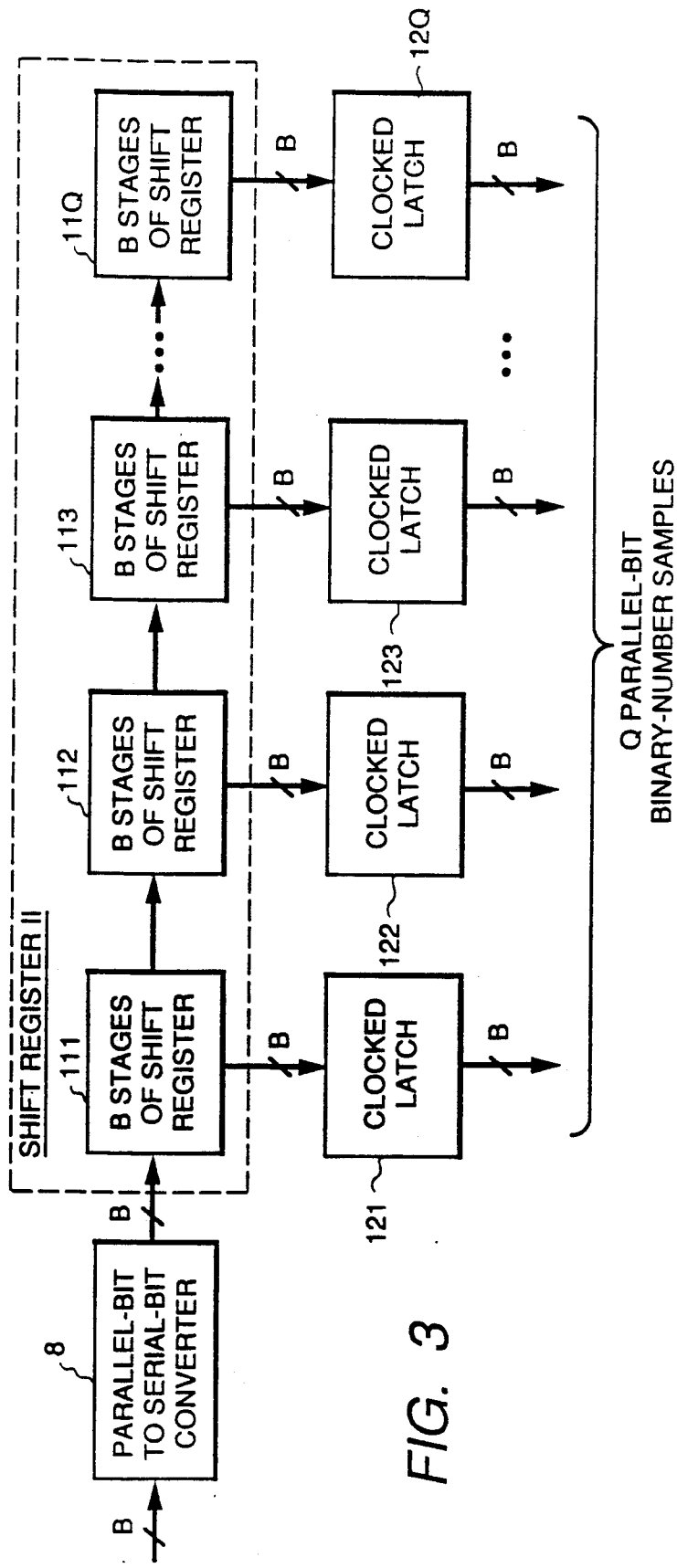
FIG. 3 is a schematic diagram of a modification of the FIG. 1 system.

FIG. 3 shows an alternative modification in which the combination of serial-bit to parallel-bit converter 9 and B-bit-wide SIPO register 10 is replaced, substituting a one-bit-wide, B×Q-stage shift register 11, each successive block 111, 112, 113, . . . 11Q of B successive stages of which shift register 11 is recurrently latched in a corresponding one of clocked latches 121, 122, 123, . . . 12Q to convert back a successive sample to parallel-bit form. The clocked latches 121, 122, 123, . . . 12Q are strobed every $B^{th}$ shift in the shift register 11.

Figure 4:
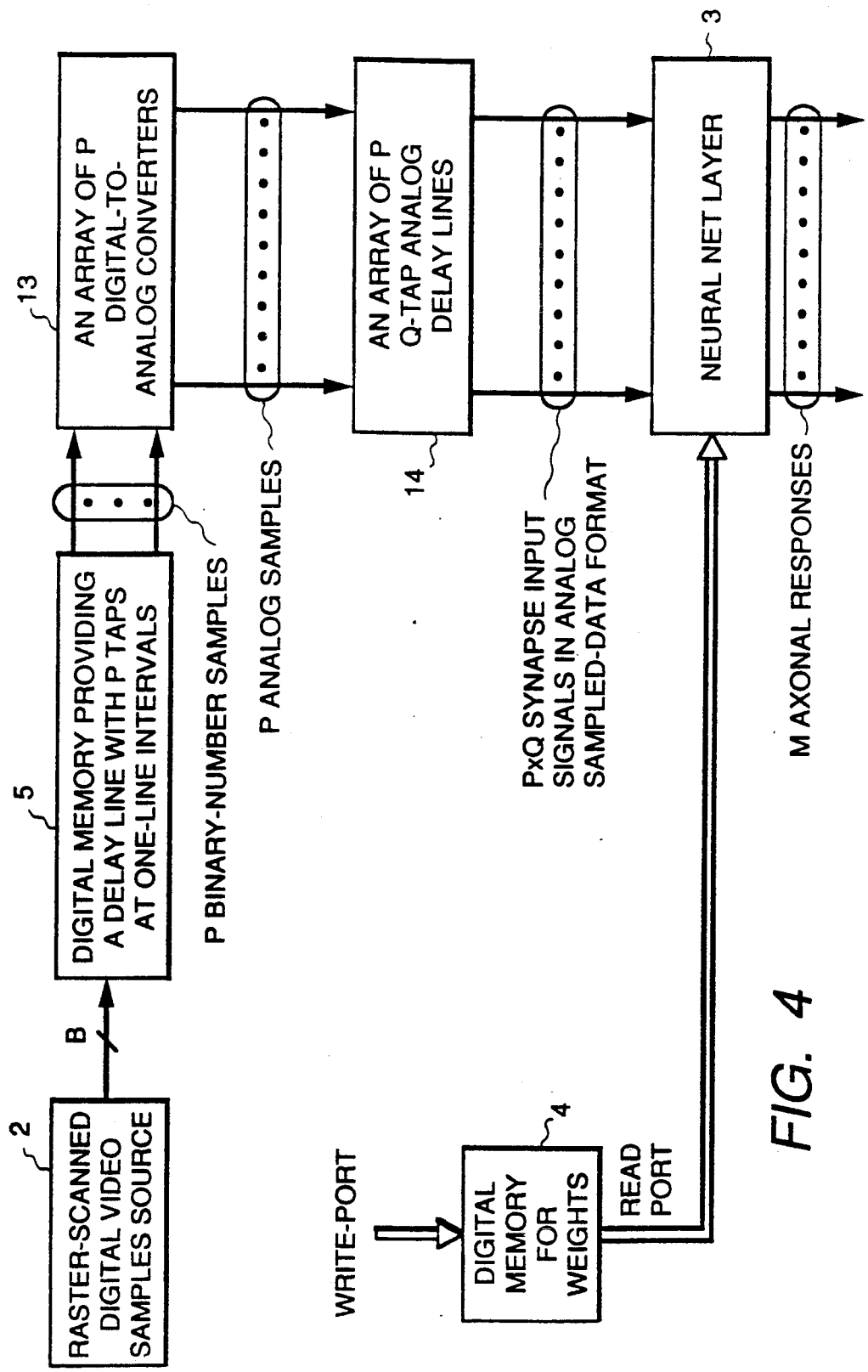
FIG. 4 is a schematic diagram of a system wherein: successive digital samples from a source of raster-scanned digital video samples are subjected to transversal one-dimensional low-pass sinc filtering to generate parallel-in-time digital samples; the parallel-in-time digital samples are converted to sampled-data analog signals in respective ones of an array of digital-to-analog converters; the sampled-data analog signals are subjected to one-dimensional low-pass sinc filtering in the time domain and in the analog regime, to generate parallel-in-time analog synapse input signals; and the analog synapse input signals are applied to a neural net layer to generate axonal responses.

FIG. 4 system differs from the FIG. 1 system in that the second step of one-dimensional low-pass sinc filtering, which takes place in the direction of line scanning, is done in the analog regime rather than in the digital regime. The P B-bit-wide digital video samples from digital memory 5 are supplied to an array 13 of digital-to-analog converters, P in number. It is advantageous to locate elements 5 and 11 in the same integrated circuit, since only P connections need be made from the array 13 of digital-to-analog converters to a succeeding integrated circuit containing therewithin an array 14 of Q-tap analog delay lines and the neural net layer 3 receiving its P×Q analog synapse input signals from that array 14 of P Q-tap analog delay lines. Each Q-tap analog delay line can be, for example, a charge-coupled-device (CCD) delay line with the gate electrode of a respective field effect transistor connecting to each of the Q successive CCD stages to measure the charge therein, which Q field effect transistors are connected as electrometers to generate voltages applied via respective analog sample-and-hold circuits as sampled-data analog synapse input signals to the neural net 3.

Where Q is large—i.e., of the order of many tens or a few hundreds—losses in the analog delay lines may become appeciable, requiring steps to be taken to refresh sample amplitude if the FIG. 4 system is to be used. The FIG. 1 system has no analogous problems of loss of sample amplitude in its array 6 of digital SIPO registers, no matter how large Q becomes.

While there is a tendency towards a large number of digital-to-analog converters to be used in the systems described in this application, it is not necessary to provide each one of these converters with its own resistance ladder or other potential divider to set the analog voltage levels associated with the various digital sample values. A single resistance ladder or other potential divider suffices to set the analog voltage levels associated with the various digital sample values for all or a large fraction of this large number of digital-to-analog converters. These analog voltage levels can be broadcast to many digital-to-analog converters, each comprising only a decoder for the digital sample to be converted to analog form and electronic switches (such as transmission gates) arranged as a multiplexer responding to the decoder outputs to apply the selected analog voltage level as synapse input signal to the analog neural net layer.

In systems embodying the invention where the neural net is of the general type described in U.S. patent application Ser. No. 366,839 entitled "NEURAL NET USING CAPACITIVE STRUCTURES CONNECTING OUTPUT LINES AND DIFFERENTIALLY DRIVEN INPUT LINE PAIRS", in which each analog synapse input signal voltage is applied in push-pull from low source impedances to a respective pair of input lines, the application of push-pull drive to each pair of input lines can be carried out by the digital-to-analog converter apparatus. Two multiplexers are included in each digital-to-analog converter, and each of these multiplexers responds to the decoder outputs to apply two selected analog voltage levels of complementary values to respective ones of a pair input lines as synapse input signal.

Figure 5:
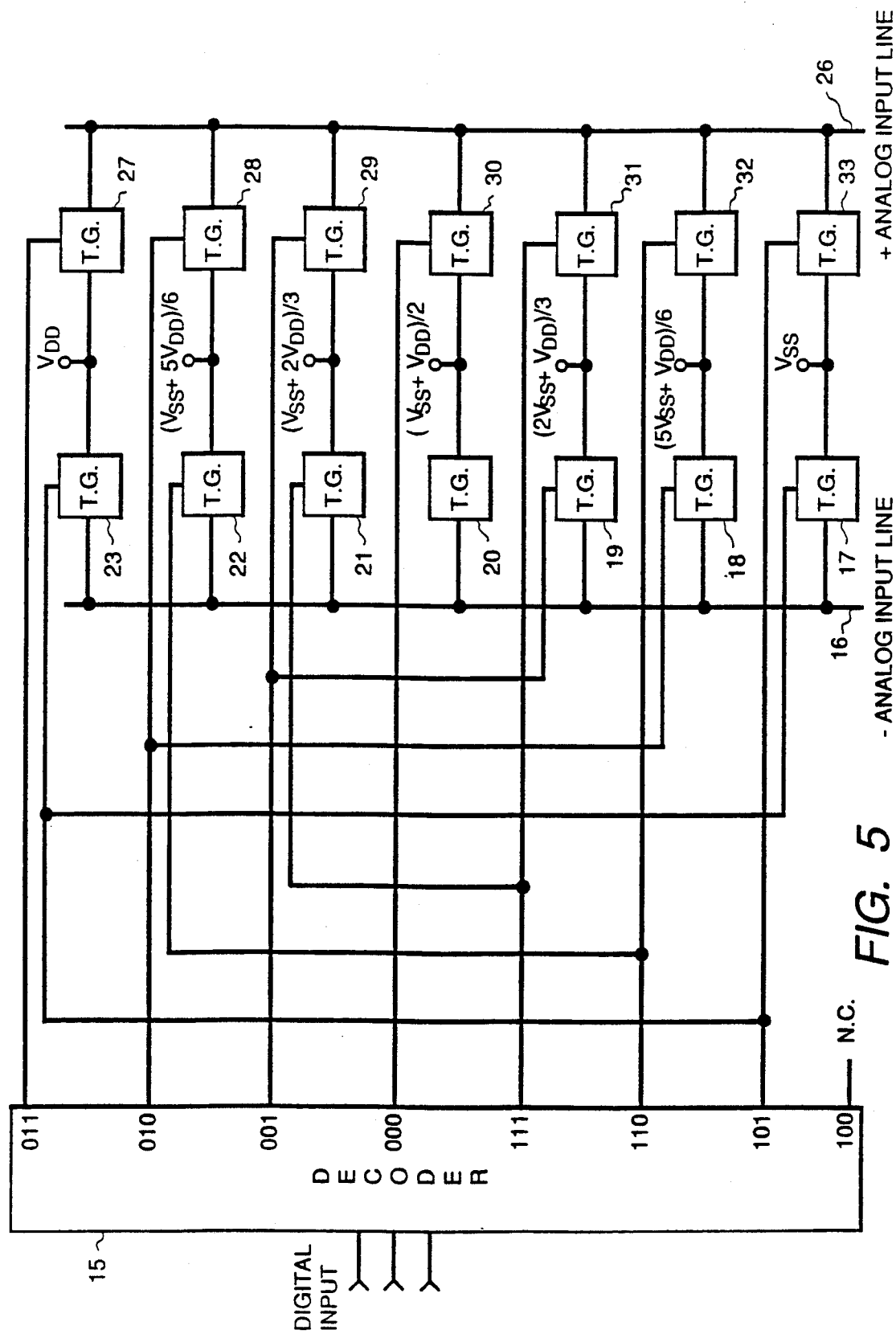
FIG. 5 is a schematic diagram of a digital-to-analog converter suitable for converting a three-bit, two's complement digital synapse input signal to a form suitable for application to a neural net as an analog synapse input signal.

FIG. 5 illustrates how push-pull drive to a pair of input lines can be carried out by a digital-to-analog converter—in this illustration, a digital-to-analog converter that converts three-bit, two's complement numbers. A decoder 15 is used to decode the eight conditions the three-bit numbers may take. The minus four condition is assumed not to be used, so the range of codes is symmetrical about zero. Decoder 15 responds to the plus three code to supply a logic ONE to transmission gates 17 and 27, conditioning transmission gate 17 to apply $V_{SS}$ to the negative analog input line 16 and transmission gate 27 to apply $V_{DD}$ to the positive analog input line 26, whereby a voltage $(V_{DD}-V_{SS})$ appears between input line 16 and input line 26. Decoder 15 responds to the plus two code to supply a logic ONE to transmission gates 18 and 28, conditioning transmission gate 18 to apply $(5V_{SS}+V_{DD})/6$ to the negative analog input line 16 and transmission gate 28 to apply $(V_{SS}+5V_{DD})/6$ to the positive analog input line 26, whereby a voltage $2(V_{DD}-V_{SS})/3$ appears between input line 16 and input line 26. Decoder 15 responds to the plus one code to supply a logic ONE to transmission gates 19 and 29, conditioning transmission gate 19 to apply $(2V_{SS}+V_{DD})/3$ to the negative analog input line 16 and transmission gate 29 to apply $(V_{SS}+2V_{DD})/3$ to the positive analog input line 26, whereby a voltage $(V_{DD}-V_{SS})/3$ appears between input line 16 and input line 26. Decoder 15 responds to the minus one code to supply a logic ONE to transmission gates 21 and 31, conditioning transmission gate 21 to apply $(V_{SS}+2V_{DD})/3$ to the negative analog input line 16 and transmission gate 31 to apply $(2V_{SS}+V_{DD})/3$ to the positive analog input line 26, whereby a voltage $-(V_{DD}-V_{SS})/3$ appears between input line 16 and input line 26. Decoder 15 responds to the minus two code to supply a logic ONE to transmission gates 22 and 32, conditioning transmission gate 22 to apply $(V_{SS}+5V_{DD})/6$ to the negative analog input line 16 and transmission gate 32 to apply $(5V_{SS}+V_{DD})/6$ to the positive analog input line 26, whereby a voltage $-2(V_{DD}-V_{SS})/3$ appears between input line 16 and input line 26. Decoder 15 responds to the minus three code to supply a logic ONE to transmission gates 23 and 33, conditioning transmission gate 23 to apply $V_{DD}$ to the negative analog input line 16 and transmission gate 33 to apply $V_{SS}$ to the positive analog input line 26, whereby a voltage $-(V_{DD}-V_{SS})$ appears between input line 16 and input line 26. For each currently decoded condition, the transmission gates conditioned for conduction responsive when another digital sample value is decoded are conditioned for not conducting during the currently decoded condition.

When digital samples having a substantial number of bits are to be converted to analog form, the problem of the analog voltage levels associated with the various digital sample values being determined accurately enough becomes difficult. With more bits the intervals between the analog voltage levels associated with the various digital sample values are smaller, so a given absolute error becomes a larger relative error respective to such an interval. There is even more tendency towards such errors causing difficulty than there is in many circuits using digital-to-analog converters, because the errors accumulate in the weighted summation procedure, especially with a large number of digital-to-analog converters having the same analog voltage levels associated with the various digital sample values. A solution to this problem, it is here pointed out, is to digit-slice the digital synapse input signals and to perform partial weighted summations on the digit slices. The results of the partial weighted summations are then subjected to a final weighted summation procedure in which each partial weighted summation result is weighted in accordance with the significance of the digit slice producing it.

Figure 6:
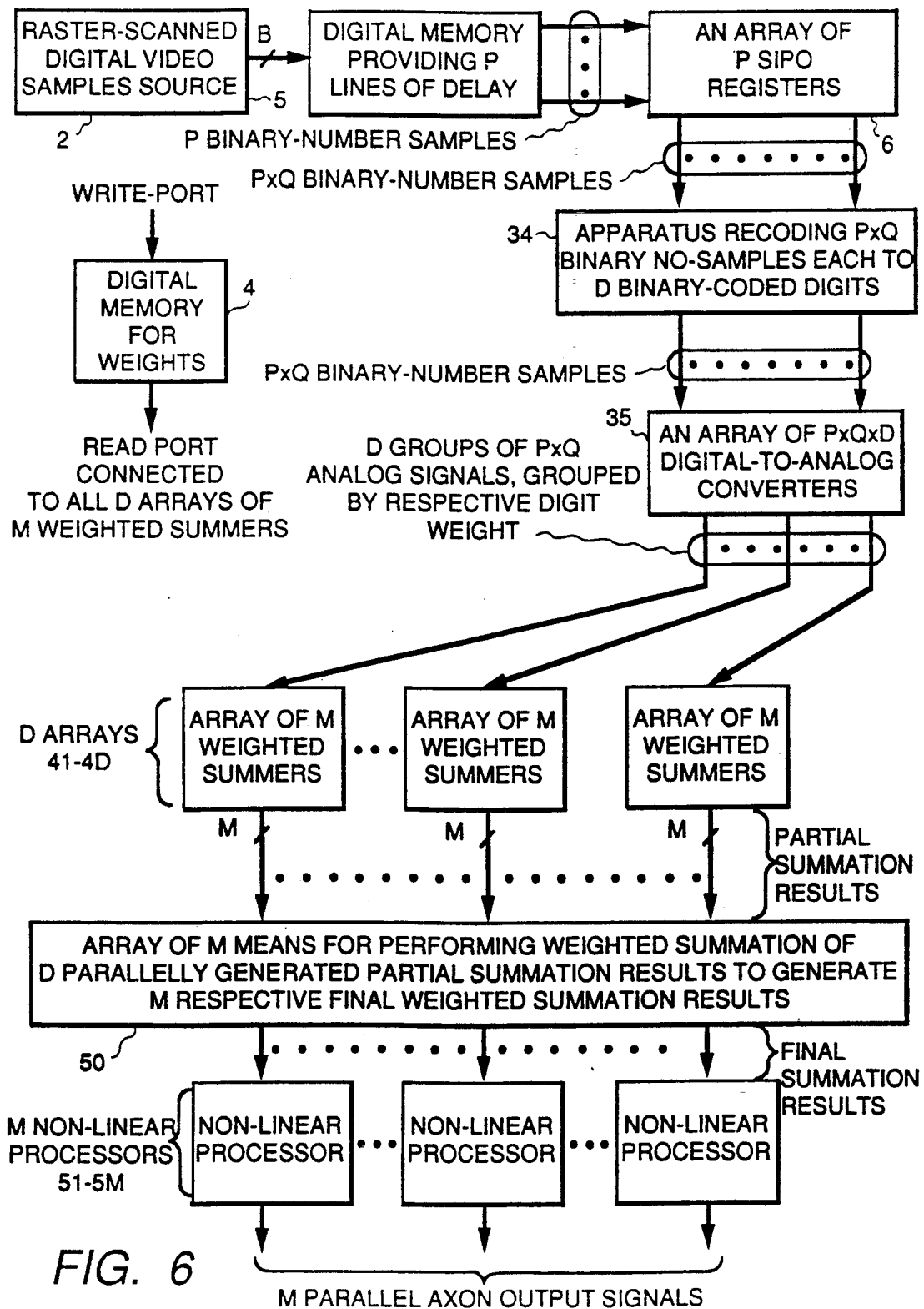
FIG. 6 is a schematic diagram of a system wherein: successive digital samples from a source of raster-scanned digital video samples are converted to parallel-in-time digital samples; the parallel-in-time digital samples are digit-sliced, the digits are converted to partial sampled-data analog synapse input signals in respective ones of an array of digital-to-analog converters; the partial sampled-data analog synapse input signals associated with each digit slice are applied as sampled-data analog synapse input signals to respective ones of replicate analog processors performing weighted summations to generate respective partial weighted summation results; partial weighted summation results are then subjected to a final weighted summation procedure, in which each partial weighted summation result included in a final weighted summation result is weighted according to the significance of the digit slices generating it; and each final weighted summation result is then subjected to non-linear processing with a sigmoidal transfer characteristic to generate a respective axonal response.

FIG. 6 shows a system for responding to shapes in a raster-scanned field of view, in which system digit-slicing is done and the partial weighted summations of the digit slices are done in parallel. As in the FIG. 1 system a plurality, $P \times Q$ in number, of binary number samples are made available simultaneously from an array 6 of P SIPO registers, with a source 2 of raster-scanned digital video samples writing a digital memory 5 providing a digital delay line with P taps at one-scan-line intervals, and with P samples at a time being read from those taps to the array 6 of SIPO registers. Apparatus 34 recodes each binary number sample into a plurality D in number of binary coded digits, a preferred coding resembling modified Booth recoding used in digital multipliers. The binary coded digits are each converted to analog form in an array 35 of digital-to-analog converters, $P \times Q \times D$ in number.

The $P \times Q$ analog signals converted from each of the D digit slices are applied to a respective one of D arrays 40, 41, . . . 4D of weighted summers to generate a number M of respective partial weighted summation results. Each of the arrays 40, 41, . . . 4D of weighted summers is similar to a neural net layer except for not including a non-linear circuit with sigmoidal transfer function for non-linearly processing the weighted sum to an axonal response. The D arrays 40, 41, . . . 4D of weighted summers all have the same pattern of weighting capacitances; and, where the weighted summers in the D arrays 40, 41, . . . 4D of are of a type having programmable weights, each of these arrays 40, 41, . . . 4D are advantageously programmed from the same digital memory 4 for weights. An array 50 of M means for performing final weighted summations performs a respective final weighted summation of the D partial weighted summation results generated in parallel by similar weighted summers, and is applied to a respective one of the non-linear processors 50, 51, . . . 5D to generate a respective one of M axonal output responses. Each of the M means for performing final weighted summations in array 50 and the one of the non-linear processors 50, 51, . . . 5D associated therewith may structurally resemble a neural net layer as previously described, supposing the final weighted summations are performed in the analog regime.

Figure 7:
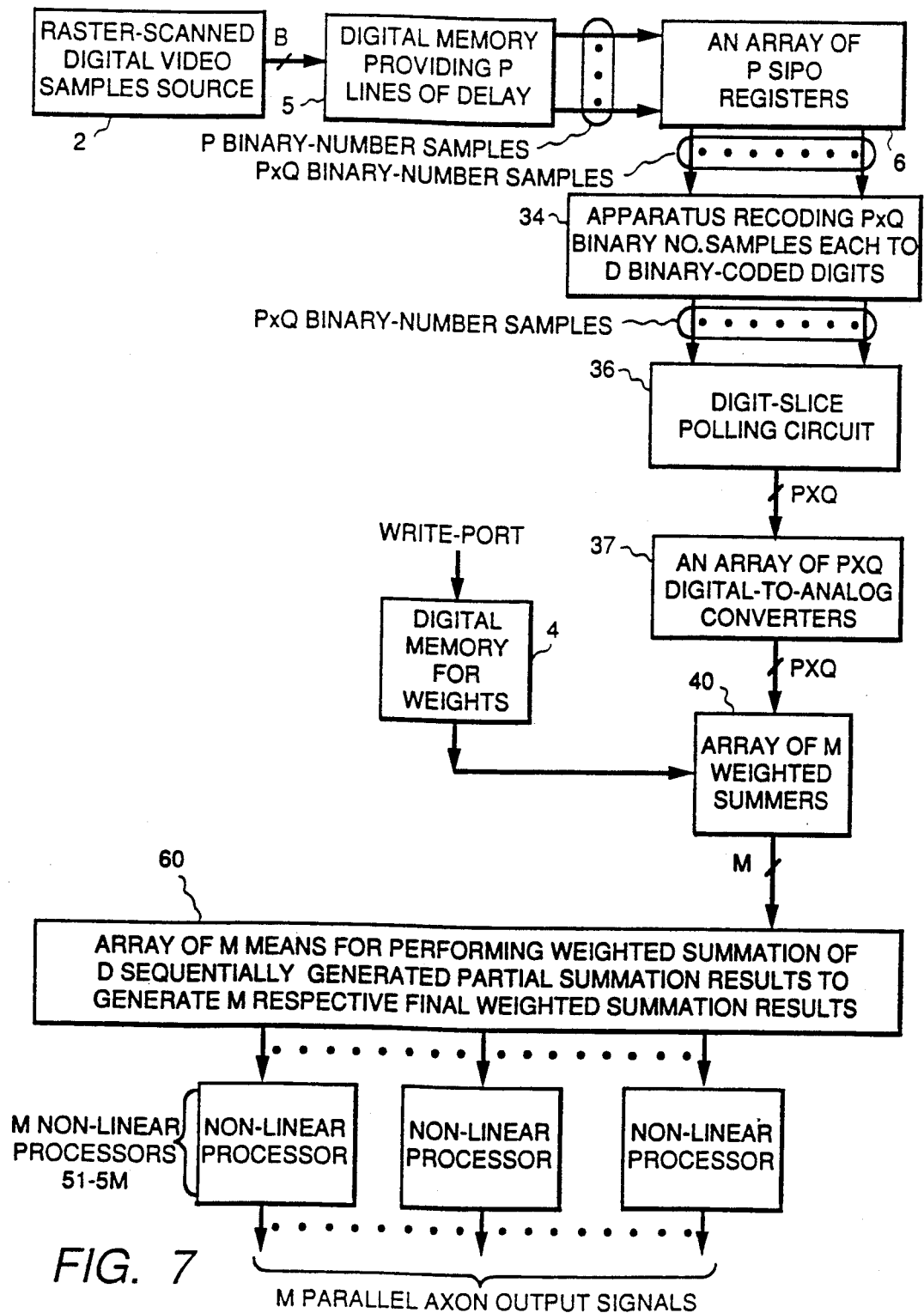
FIG. 7 is a schematic diagram of a system wherein: successive digital samples from a source of raster-scanned digital video samples are converted to parallel-in-time digital samples; the parallel-in-time digital samples are digit-sliced, the digits associated with each successively polled digit slice are converted to partial sampled-data analog synapse input signals in respective ones of an array of digital-to-analog converters; the partial sampled-data analog synapse input signals associated with each successively polled digit slice are applied as sampled-data analog synapse input signals to analog processors performing weighted summations to generate respective partial weighted summation results; partial weighted summation results are then subjected to a final weighted summation procedure, in which each successive partial weighted summation result included in a final weighted summation result is weighted according to the significance of the digit slice generating it; and each final weighted summation result is then subjected to non-linear processing with a sigmoidal transfer characteristic to generate a respective axonal response.

FIG. 7 shows another system for responding to shapes in a raster-scanned field of view in which digit-slicing is done, but in which the partial weighted summations are done sequentially, one after the other. In the FIG. 7 system a digit-slice polling circuit 36 is arranged to sequentially select the digit slices to an array 37 of digital-to-analog converters for conversion to analog signals that are applied to a single array 40 of weighted summers, shown as being of a type having weighting capacitors with capacitances that are programmable in accordance with weighting words stored in digital memory 4. The FIG. 7 system uses only a single array 40 of weighted summers, rather than the D such arrays 40, 41, . . . 4D as in FIG. 6; and the array 37 has only $P \times Q$ digital-to-analog converters, rather than $P \times Q \times D$ digital-to-analog converters as in the array 35 of FIG. 6. An array 60 of M means for performing final weighted summations performs a respective final weighted summation of the D partial weighted summation results generated sequentially by each weighted summer in array 40, and is applied to a respective one of the non-linear processors 50, 51, . . . 5D to generate a respective one of M axonal output responses.

Supposing the final weighted summations are performed in the analog regime, each means for performing final weighted summations in array 60 may comprise a Miller integrator in which the gain of the feedback loop is adjusted with the integration of each successive partial weighted summation result, the adjustment being made to suit the weight of the digit slice generating the particular partial weighted summation result. The details of how final weighted summations are performed in the FIG. 6 and FIG. 7 systems are treated further on in this specification, after the description of the procedures preferred by the inventor for digit-slicing and digital-to-analog converting.

Figure 8:
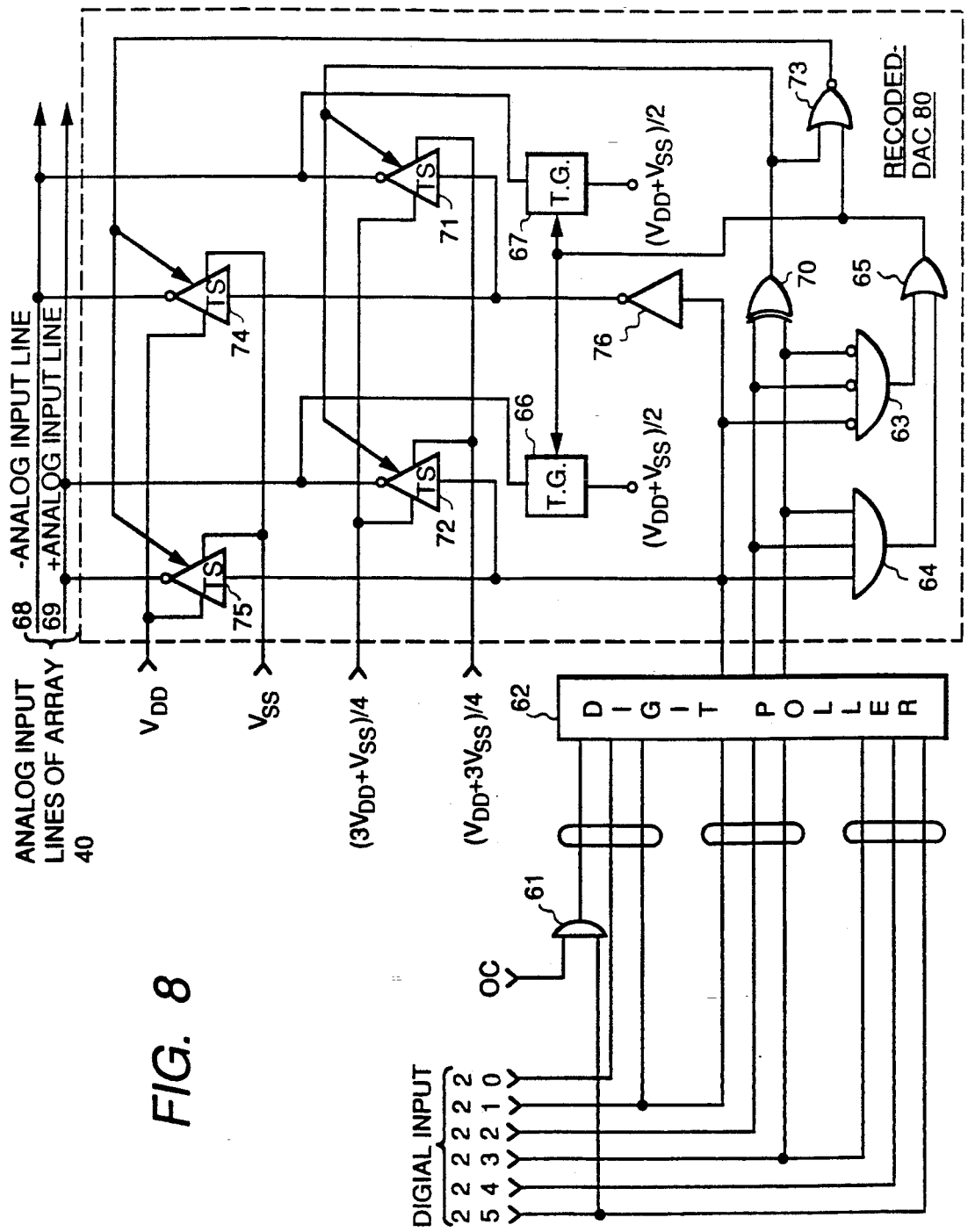
FIG. 8 is a schematic diagram of a digit-sliced digital-to-analog converter as may be used in the FIG. 7 system.

FIG. 8 shows digit-slicing and digital-to-analog converting circuitry for the FIG. 7 system. The digit-slicing is of a type where there is borrowing from digits in the next digit slice. Each successively more significant digit has a weight four times larger than the weight of the immediately preceding less significant digit. The digital input signal is presumed to have an even number of bits—here, six—when using the preferred digit-slicing and digital-to-analog converting scheme. If the digital input signal is in two's complement form, an AND gate 61 receives a ZERO at the OC connection thereof, to force its output response to ZERO. The output response of AND gate 61 and the $2^0$ and the $2^1$ bit places of the digital input signal form a first binary-coded digit; the $2^1$, $2^2$ and $2^3$ bit places of the digital input signal form a second binary-coded digit; the $2^3$, $2^4$ and $2^5$ bit places of the digital input signal form a third binary-coded digit. One of these three binary-coded digits is selected by a digit poller 62 that is one of $P \times Q$ such digital pollers, each associated with a different digital input signal and included in the digit-slice polling circuit 36 of FIG. 7.

Each digit-slice is recoded to one of the five values $-2$, $-1$, $0$, $+1$ or $+2$ in a procedure similar to the modified Booth recoding used in certain digital multiplier designs, and the recoded value is converted to analog form. The digital-to-analog conversion involves only five analog voltage levels with four analog voltage intervals therebetween. Table 1, following, summarizes the recoding and digital-to-analog conversion procedures.

TABLE I

| RECODING & DIGITAL-TO-ANALOG CONVERSION | | | |
|---|---|---|---|
| DIGIT SLICE | RECODED VALUE | − ANALOG INPUT | + ANALOG INPUT |
| 000 | 0 | $(V_{SS} - V_{DD})/2$ | $(V_{SS} - V_{DD})/2$ |
| 001 | +1 | $(3V_{SS} - V_{DD})/4$ | $(V_{SS} - 3V_{DD})/4$ |
| 010 | +1 | $(3V_{SS} - V_{DD})/4$ | $(V_{SS} - 3V_{DD})/4$ |
| 011 | +2 | $V_{SS}$ | $V_{DD}$ |
| 100 | −2 | $V_{DD}$ | $V_{SS}$ |
| 101 | −1 | $(V_{SS} + 3V_{DD})/4$ | $(3V_{SS} + V_{DD})/4$ |
| 110 | −1 | $(V_{SS} + 3V_{DD})/4$ | $(3V_{SS} + V_{DD})/4$ |
| 111 | 0 | $(V_{SS} + V_{DD})/2$ | $(V_{SS} + V_{DD})/2$ |

Referring to FIG. 8, the implementation of the procedures tabulated in the foregoing table in the FIG. 7 system will now be explained, beginning with the 0 recoding condition. An AND gate 63 receives the one's complement of the digit selected by digit poller 62 as its three bit inputs and responds with a ONE to digit poller 62 selecting a 000 digit. An AND gate 64 directly receives the digit selected by digit poller 62 as its three bit inputs and responds with a ONE to digit poller 62 selecting a 111 digit. An OR gate 65 responds with a ONE to AND gate 63 detecting a 000 digit being supplied from digit poller 62 or to AND gate 64 detecting a 111 digit being supplied from digit poller 62. A ONE from OR gate 65 conditions transmission gates 66 and 67 to be conductive to apply $(V_{SS}+V_{DD})/2$ potential from relatively low source impedances to both the negative analog input line 68 and the positive analog input line 69 of the array 40 of weighted summers shown in FIG. 7. An exclusive OR gate 70 has ZERO response to the least two significant bits of the 000 or 111 digit being the same. ZERO response from OR gate 70 conditions a tristate inverter 71 to offer high output impedance to the negative analog input line 69 and a tristate inverter 72 to offer high output impedance to the positive analog input line 69. A NOR gate 73 responds to OR gate 65 output response being a ONE to generate a ZERO response, which conditions a tristate inverter 74 to offer high output impedance to the negative analog input line 68 and conditions a tristate inverter 73 to offer high output impedance to the positive analog input line 69.

For the +1 recoding condition, digit poller 62 selects either 001 or 010 as its output response. The ZERO that is the most significant bit of the digit 001 or 010 selected by digit poller 62 is applied as a LOW signal to the tristate inverter 72, conditioning tristate inverter 72 to respond with its HIGH signal $(3V_{DD}+V_{SS})/4$ at its output to the positive analog input line 69. The ZERO as most significant bit of the digit 001 and 010 is inverted to a ONE by a logic inverter 76, and that ONE is applied as a HIGH signal to the tristate inverter 71, conditioning tristate inverter 71 to respond with its LOW signal $(V_{DD}+3V_{SS})/4$ at its output to the negative analog input line 68. The exclusive OR gate 70 receives a ONE and a ZERO as its two input bits and responds with a ONE that conditions the tristate inverter inverter 71 to supply its $(V_{DD}+3V_{SS})/4$ LOW signal with a low output impedance to the negative analog input line 68 and that conditions the tristate inverter 72 to supply its $(3V_{DD}+V_{SS})/4$ HIGH signal with a low output impedance to the positive analog input line 68.

Digit poller 62 selecting either 001 or 010 as its output response causes ZERO responses from AND gates 63 and 64, so OR gate 65 response to these AND gate responses is a ZERO, conditioning the transmission gates 66 and 67 both to be non-conductive. NOR gate 73 responds to exclusive OR gate 70 output response being a ONE to generate a ZERO response, which conditions the tristate inverter 74 to offer high output impedance to the negative analog input line 68 and conditions the tristate inverter 73 to offer high output impedance to the positive analog input line 69.

For the +2 recoding condition, digit poller 62 selecting 011 causes ZERO responses from AND gates 63 and 64, so OR gate 65 response to these AND responses is a ZERO, conditioning the transmission gates 66 and 67 both to be non-conductive. The exclusive OR gate 70 receives ONEs as its bit inputs and responds with a ZERO that conditions the tristate inverter 71 to offer high output impedance to the negative analog input line 68 and that conditions the tristate inverter 72 to offer high output impedance to the positive analog input line 69. Since OR gate 65 response and exclusive OR gate 70 response are respective ZEROs applied as the two bit inputs to NOR gate 73, NOR gate 73 responds with a ONE to condition tristate inverters 74 and 75 to apply their respective responses with low output impedances to negative analog input line 68 and to positive analog input line 69, respectively. Tristate inverter 75 receives as a LOW signal the ZERO that is the most significant bit of the digit 011 selected by digit poller 62 and responds with its HIGH signal $V_{DD}$ at its output to the positive analog input line 69. The ZERO as most significant bit of the digit 011 is inverted to a ONE by the logic inverter 76, and that ONE is applied as a HIGH signal to the tristate inverter 74, conditioning tristate inverter 74 to respond with its LOW signal $V_{SS}$ at its output to the negative analog input line 68.

For the −1 recoding condition, digit poller 62 selects either 101 or 110 as its output response. The ONE that is the most significant bit of the digit 101 or 110 selected by digit poller 62 is applied as a HIGH signal to the tristate inverter 72, conditioning the tristate inverter 72 to respond with its LOW signal $(V_{DD}+3V_{SS})/4$ at its output to the positive analog input line 69. The ONE as most significant bit of the digit 101 or 110 is inverted to a ZERO by the logic inverter 76, and that ZERO is applied as a HIGH signal to the tristate inverter 71, conditioning tristate inverter 71 to respond with its HIGH signal $(3V_{DD}+V_{SS})/4$ at its output to the negative analog input line 68. The exclusive OR gate 70 receives a ZERO and a ONE as its two input bits and responds with a ONE that conditions the tristate inverter 71 to supply its $(3V_{DD}+V_{SS})/4$ HIGH signal with a low output impedance to the negative analog input line 68 and that conditions the tristate inverter 72 to supply its $(V_{DD}+3V_{SS})/4$ LOW signal with a low output impedance to the positive analog input line 68.

Digit poller 62 selecting either 101 or 110 as its output response causes ZERO responses from the AND gates 63 and 64, so OR gate 65 response to these AND gate responses is a ZERO, conditioning the transmission gates 66 and 67 both to be non-conductive. NOR gate 73 responds to exclusive OR gate 70 output response being a ONE to generate a ZERO response, which conditions the tristate inverter 74 to offer high output impedance to the negative analog input line 68 and conditions the tristate inverter 73 to offer high output impedance to the positive analog input line 69.

For the −2 recoding condition, digit poller 62 selecting 100 causes ZERO responses from the AND gates 63 and 64, so OR gate 65 response to these AND responses is a ZERO, conditioning the transmission gates 66 and 67 both to be non-conductive. The exclusive OR gate 70 receives ZEROs as its bit inputs and responds with a ZERO that conditions the tristate inverter 71 to offer high output impedance to the negative analog input line 68 and that conditions the tristate inverter 72 to offer high output impedance to the positive analog input line 69. Since OR gate 65 response and exclusive OR gate 70 response are respective ZEROs applied as the two bit inputs to the NOR gate 73, NOR gate 73 responds with a ONE to condition tristate inverters 74 and 75 to apply their respective responses with low output impedances to negative analog input line 68 and to positive analog input line 69, respectively. Tristate inverter 75 receives as a HIGH signal the ONE that is the most significant bit of the digit 100 selected by digit poller 62 and responds with its LOW signal $V_{SS}$ at its output to the positive analog input line 69. The ONE as most significant bit of the digit 011 is inverted to a ZERO by a logic inverter 76, and that ZERO is applied as a LOW signal to the tristate inverter 74, conditioning tristate inverter 74 to respond with its HIGH signal $V_{DD}$ at its output to the negative analog input line 68.

Figure 9:
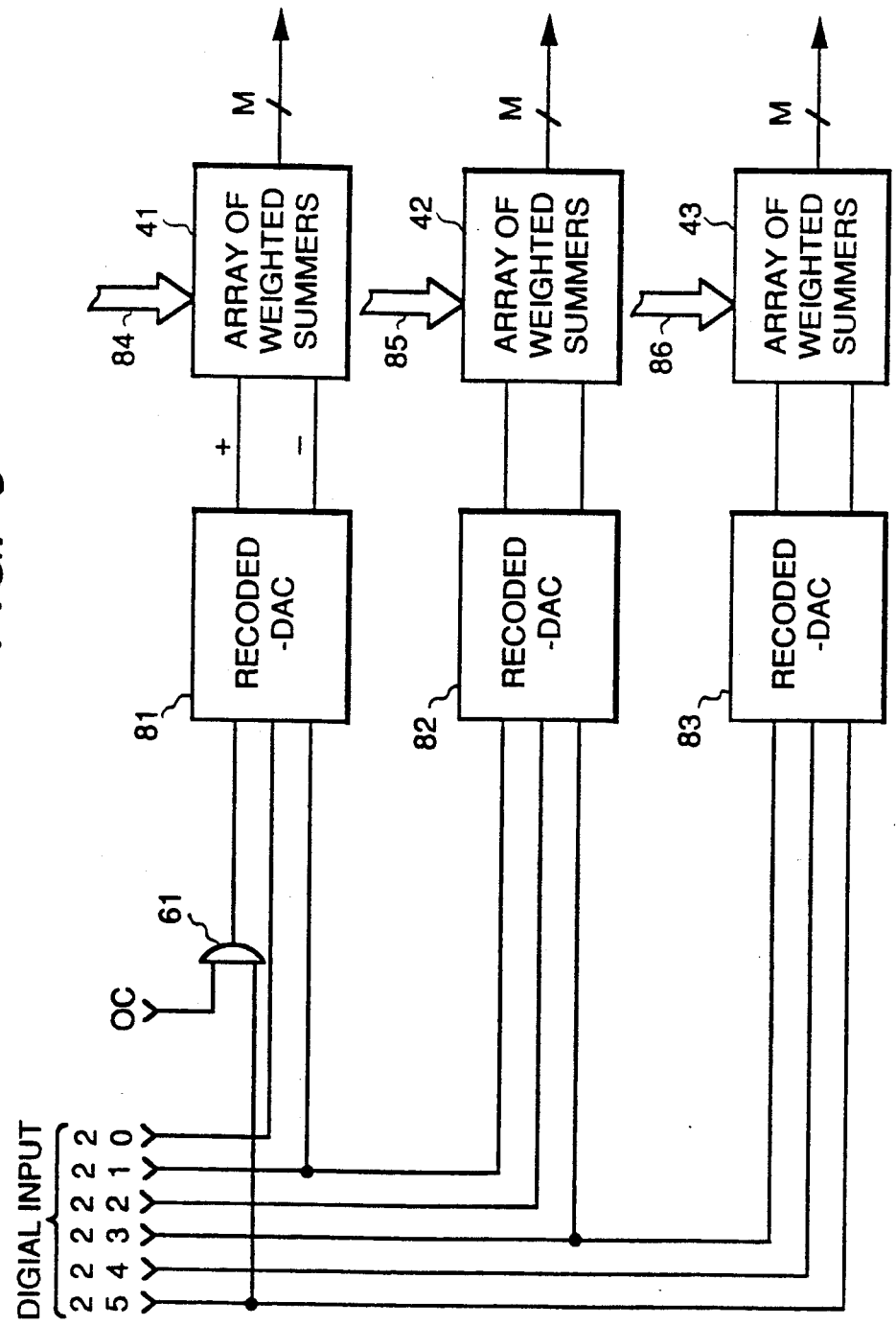
FIG. 9 is a schematic diagram of how digit-sliced digital-to-analog converters as shown in FIG. 8 may be used in the FIG. 6 system.

The apparatus within the box 80 shown in dashed outline in FIG. 8 may be referred to as a "recoded-digital-to-analog converter" for the sake of convenience when considering the FIG. 9 circuitry for implementing in the FIG. 6 system the procedures tabulated in TABLE 1. In the FIG. 6 system each of the digital input signals may be a respective six-bit two's complement number. As shown in FIG. 9 each of the P×Q digital input signals is separated into three digits, which are supplied to respective recoded-digital-to-analog converters 81, 82 and 83 to develop push-pull analog input signals for the arrays 41, 42 and 43 of weighted summers respectively. The array 41 of weighted summers receives via bus 84 the (P×Q)−1 other push-pull analog input signals from the (P×Q)−1 other recoded-digital-to-analog converters processing the least significant digits of the (P×Q)−1 other digital input signals. The array 42 of weighted summers receives via bus 85 the (P×Q)−1 other push-pull analog input signals from the (P×Q)−1 other recoded-digital-to-analog converters processing the digits of intermediate significance in the (P×Q)−1 other digital input signals. And the array 43 of weighted summers receives via bus 86 the (P×Q)−1 other push-pull analog input signals from the (P×Q)−1 other recoded-digital-to-analog converters processing the most significant digits of the (P×Q)−1 other digital input signals.

The digit-slicing, the recoding of the digit-slices, and the conversion of the recoded digit slices to analog input signals can be done for digital input signals that are one's complement, rather than two's complement, signed numbers. One's complement digital input signals are accommodated in the FIG. 8 or FIG. 9 circuitry simply by applying a ONE rather than a ZERO to the OC input connection of the AND gate 61. Where the number of bits in each of the analog input signals does not correspond to a multiple of the number of bits per digit, the analog input signals are provided extra sign bits in a sign bit extension procedure that makes the number of bits in each of the extended analog input signals a multiple of the number of bits per digit. Modifications wherein the digits in the digit slices have more than three bits in them are possible, and may reduce the number of digits that have to successively polled in modifications of the FIG. 7 system as thusfar described. However, the number of analog voltage levels that need to be defined rises (e.g., to nine levels for a four-bit code), and there is an attendant increase in the problem of cumulative voltage error in the analog weighted summation procedures.

Figure 10:
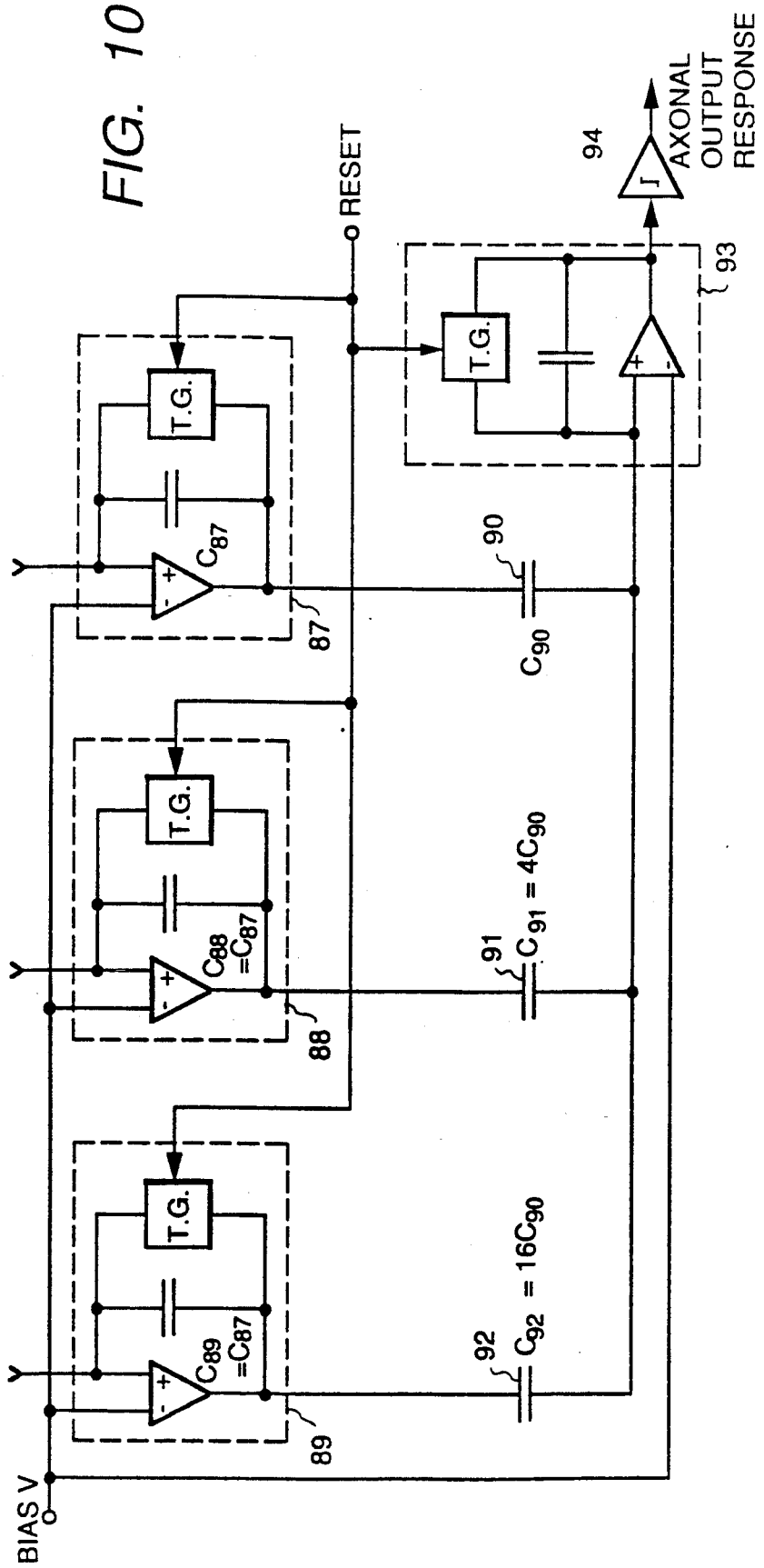
FIG. 10 is a schematic diagram of means, as can be used in the FIG. 6 system, for performing weighted summation of the respective partial summation results as parallelly supplied for a plurality of digit slices, thereby to generate a final weighted summation result.

FIG. 10 shows a single means for performing weighted summation of parallelly supplied partial weighted summation results generated by digit-sliced weighted summation procedures, thereby to generate a final weighted summation result which will be non-linearly processed to generate a respective axon output response. A plurality M of such means are found in the array 50 of such means in the FIG. 6 system. FIG. 10 shows three partial weighted summation results generated by respective digit-slice weighted summation networks that respectively include integrators 87, 88 and 89 as their respective charge-sensing output stages. Only the integrators 87, 88 and 89 of these weighted summation networks are shown in FIG. 10; and these integrators 87, 88 and 89 are shown as being Miller integrators of the type for sensing charge on single-ended output lines from the weighting capacitor network. Accordingly, the digit-sliced weighted summation networks, D times M in number, may each be of the type described in detail in U.S. patent application Ser. No. 366,839 entitled "NEURAL NET USING CAPACITIVE STRUCTURES CONNECTING OUTPUT LINES AND DIFFERENTIALLY DRIVEN INPUT LINE PAIRS".

The integrators 87, 88 and 89 respectively supply the partial weighted summation results for the least significant digit slice, the next least significant digit slice and the most significant digit slice, which digit slices have respective significances in 1:4:16 ratio. The partial weighted summation results for the least significant digit slice, the next least significant digit slice and the most significant digit slice charge capacitors 90, 91 and 92 respectively, which have respective capacitances $C_{90}$, $C_{91}$ and $C_{92}$ in 1:4:16 ratio. So for integrator 87, 88 and 89 output voltages of the same level, capacitors 90, 91 and 92 accumulate charges in 1:4:16 ratio. Charges accumulated in capacitors 90, 91 and 92 are proportional to integrator 87, 88 and 89 output voltages as scaled in 1:4:16 ratio. The total charge accumulated in capacitors 90, 91 and 92 is sensed by another Miller integrator 93 of single-ended type to generate a final weighted summation result. This final weighted summation result is supplied to a non-linear amplifier 94, which has a sigmoidal transfer function and responds to provide an axonal output response.

From time to time integrators 87, 88, 89 and 93 are reset to re-establish proper bias levels therein. Re-setting is done by applying a reset pulse to the transmission gates (shown in FIG. 10 as blocks with the initials T. G. therein) respectively shunting the Miller feedback capacitors in the Miller integrators 87, 88, 89 and 93 to condition those transmission gates to be conductive for discharging the Miller feedback capacitors. This places all the input and output terminals of each Miller integrator at the bias voltage BIAS V applied to its inverting input connection.

To make it simpler to understand the basic final weighted summation procedure when the partial weighted summation results are available parallelly in time, FIG. 10 shows integrators 87, 88 and 89 having Miller capacitors with capacitances $C_{89}$, $C_{88}$ and $C_{87}$ in 1:1:1 ratio. In actual practice the overall area taken up on the integrated circuit die by these Miller capacitors and by capacitors 90, 91 and 92 can be reduced by scaling capacitances $C_{87}$, $C_{88}$ and $C_{89}$ to be in 4:1:1 ratio with each other and by scaling capacitances $C_{90}$, $C_{91}$ and $C_{92}$ to be in 1:1:4 ratio with each other. The scaling of capacitances $C_{87}$, $C_{88}$ and $C_{89}$ to be in 4:1:1 ratio with each other scales the output voltages of integrators 87, 88 and 89 to be in 0.25:1:1 ratio with each other; and the scaling of capacitances $C_{90}$, $C_{91}$ and $C_{92}$ to be in 1:1:4 ratio with each other completes the scaling of charges accumulated in capacitors 90, 91 and 92 responsive to a weighted digit slice to be in 0.25:1:4 or 1:4:16 ratio with each other.

Where the digit-sliced weighted summation networks are each of the type described in detail in U.S. patent application Ser. No. 366,838 entitled "NEURAL NET USING CAPACITIVE STRUCTURES CONNECTING INPUT LINES AND DIFFERENTIALLY SENSED OUTPUT LINE PAIRS", the single means for performing weighted summation of parallelly supplied partial weighted summation results generated by digit-sliced weighted summation procedures, thereby to generate a final weighted summation result, will differ from that shown in FIG. 10 in that the single-ended Miller integrators 87, 88 and 89 are replaced by respective Miller integrators of the balanced integrator type. Variants of the two thusfar-described single means for performing weighted summation of parallelly supplied partial weighted summation results are also possible, of course, wherein the Miller integrator 93 is replaced by a Miller integrator of the balanced integrator type.

Figure 11:
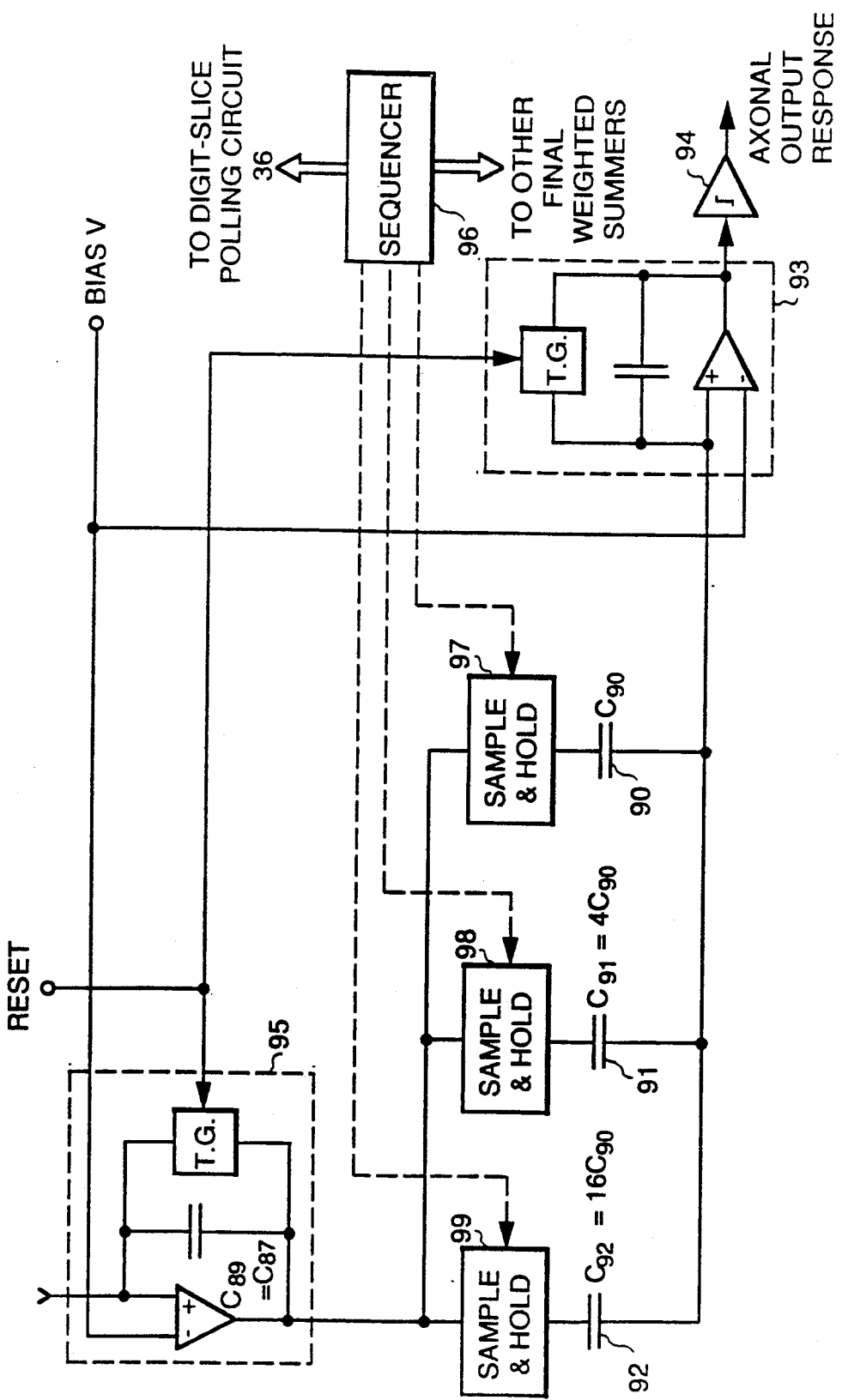
FIG. 11 is a schematic diagram of means, as can be used in the FIG. 7 system, for performing weighted summation of the respective partial summation results as sequentially supplied for a plurality of digit slices, thereby to generate a final weighted summation result.

FIG. 11 shows a single means for performing weighted summation of sequentially supplied partial weighted summation results generated by digit-sliced weighted summation procedures, thereby to generate a final weighted summation result which will be non-linearly processed to generate a respective axon output response. A plurality M of such means are found in the array 60 of such means in the FIG. 7 system. FIG. 11 presumes three partial weighted summation results are sequentially generated by digit-slice weighted summation networks that includes an integrator 95 as its charge-sensing output stage. Only the integrator 95 of this weighted summation network is shown in FIG. 11; and integrator 95 is shown as being a Miller integrator of the type for sensing charge on a single-ended output line from the weighting capacitor network. Accordingly, the M digit-slice weighted summation networks may be of the type described in detail in U.S. patent application Ser. No. 366,839 entitled "NEURAL NET USING CAPACITIVE STRUCTURES CONNECTING OUTPUT LINES AND DIFFERENTIALLY DRIVEN INPUT LINE PAIRS".

A sequencer 96 in FIG. 11 directs the digit-slice polling circuit 36 in FIG. 7 to sequentially select from recoding apparatus 34 in FIG. 7 the most significant digit slice, the nextmost significant digit slice, and the least significant digit slice means for application to the array 37 of P times Q digital-to analog converters in FIG. 7. The sequencer 96 also directs in FIG. 11 the sequential sampling of the sequentially supplied partial weighted summation results of the single means for performing weighted summation of sequentially supplied partial weighted summation results generated by digit-sliced weighted summation procedures, thereby to generate a final weighted summation result, which comprises elements 90-94 and 97-99. More particularly, the sequencer 96 sequentially instructs the sampling and holding of each of the partial weighted summation results sequentially supplied from the integrator 95 in sample-and-hold circuits 97, 98 and 99. The sequencer 96 also directs the sequential sampling of the sequentially supplied partial weighted summation results of each of the (M−1) other means in the array 60 of FIG. 7 for performing weighted summation of sequentially supplied partial weighted summation results.

Sequentially selecting the most significant digit slice, then the nextmost significant digit slice, and lastly the least significant digit slice means is usually the preferred order of selection. This is particularly so when the axonal output signals are subsequently digitized using an oversampling analog-to-digital converter of the sigma-delta type or another type of analog-to-digital converter that converts by successive approximation, because the information necessary to begin the successive approximation procedures is least delayed.

Where the digit-sliced weighted summation networks are each of the type described in detail in U.S. patent application Ser. No. 366,838 entitled "NEURAL NET USING CAPACITIVE STRUCTURES CONNECTING INPUT LINES AND DIFFERENTIALLY SENSED OUTPUT LINE PAIRS", the single means for performing weighted summation of sequentially supplied partial weighted summation results generated by digit-sliced weighted summation procedures, thereby to generate a final weighted summation result, will differ from that shown in FIG. 11 in that the single-ended Miller integrator 95 is replaced by a Miller integrator of the balanced integrator type. Variants of the two thusfar-described single means for performing weighted summation of sequentially supplied partial weighted summation results are also possible, of course, wherein the Miller integrator 93 is replaced by a Miller integrator of the balanced integrator type.

As previously noted, a U.S. patent application Ser. No. 525,931 entitled "WEIGHTED SUMMATION CIRCUITS HAVING DIFFERENT-WEIGHT RANKS OF CAPACITIVE STRUCTURES" describes how weighting capacitors can be constructed on a bit-sliced or binary-digit-sliced basis. FIGS. 12-15 show how the teachings of this earlier disclosure may be applied to systems constructed in accordance with the present invention.

Figure 12:
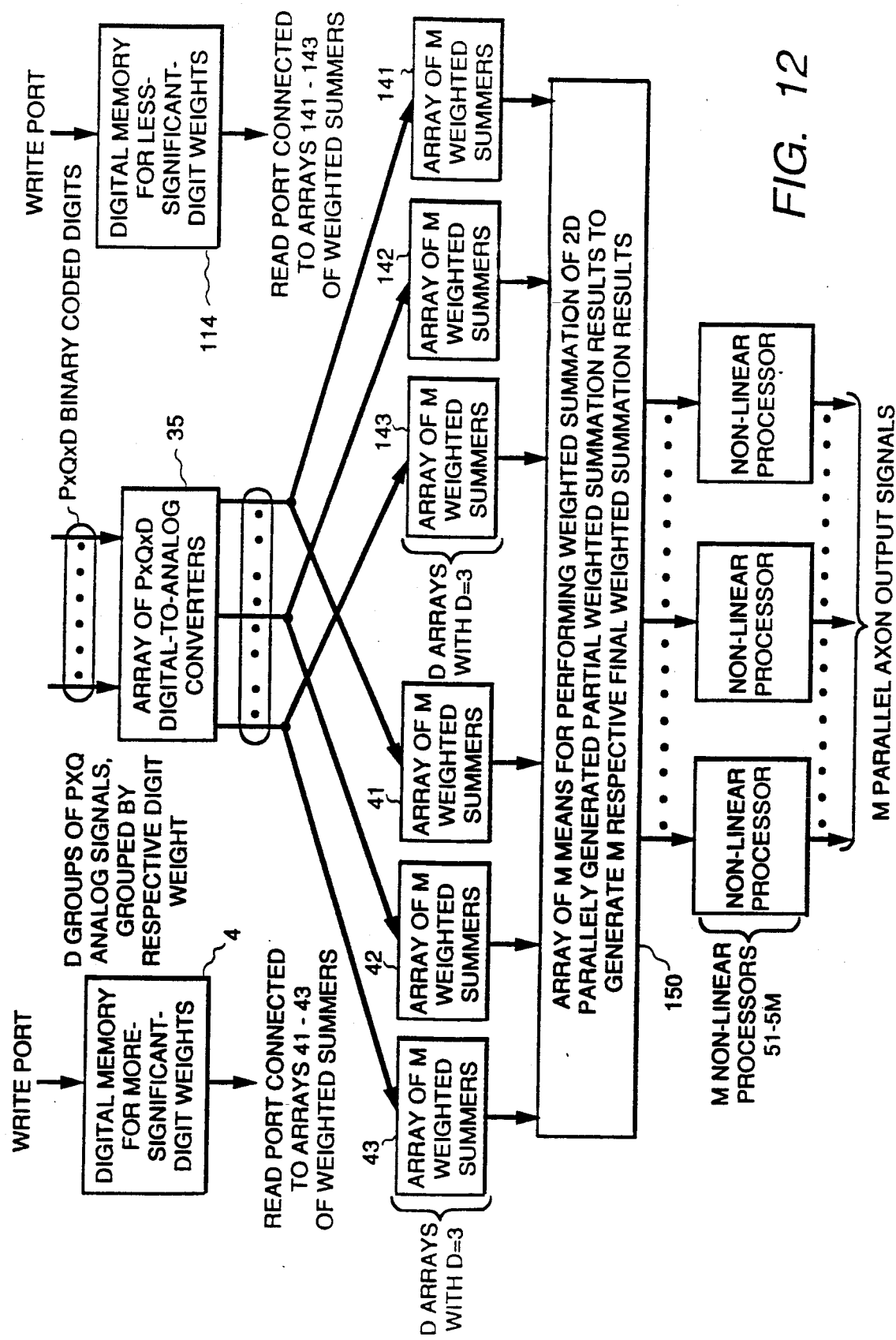
FIG. 12 is a schematic diagram of a modification that can be made to the FIG. 6 system to reduce the area taken up by weighting capacitors in accordance with the inventor's teachings in his U.S. patent application entitled "WEIGHTED SUMMATION CIRCUITS HAVING DIFFERENT-WEIGHT RANKS OF CAPACITIVE STRUCTURES".

FIG. 12 is a schematic diagram of a modification that can be made to the FIG. 6 system to reduce the area taken up by weighting capacitors in accordance with the inventor's teachings in his U.S. patent application entitled "WEIGHTED SUMMATION CIRCUITS HAVING DIFFERENT-WEIGHT RANKS OF CAPACITIVE STRUCTURES". The number D of digit slices is presumed to be three, and the weighting capacitors are presumed to be arranged in two ranks having respective significances of weighting in 8:1 ratio. The most significant digit-slice of the P times Q times D analog input signals generated by the array 35 of digital-to-analog converters, the nextmost significant digit-slice and the least significant digit-slice are respectively applied to the arrays 43, 42 and 41 of weighted summers, similar to the FIG. 6 system. The arrays 41, 42 and 43 weighted summers are all similar to each other, similar to the FIG. 6 system, with similar patterns of weighting in each, as established by the digital memory 4 for weights in accordance with the more significant digit slice of the complete pattern of weighting capacitor values. Additionally, however, the most significant digit-slice of the P times Q times D analog input signals generated by the array 35 of digital-to-analog converters, the nextmost significant digit-slice and the least significant digit-slice are respectively applied to the arrays 143, 142 and 141 of weighted summers. The arrays 141, 142 and 143 of weighted summers are all similar to each other, with similar patterns of weighting in each, as established by a further digital memory 104 for weights in accordance with the less significant digit slice of the complete pattern of weighting capacitor values. FIG. 12 shows an array 150 of M means for performing weighted summation of 2D (here, by way of example, six) partial summation results each to generate M respective final weighted summation results to be non-linearly processed by non-linear processors 51-5M respectively to generate M axon output signals in parallel.

Figure 13:
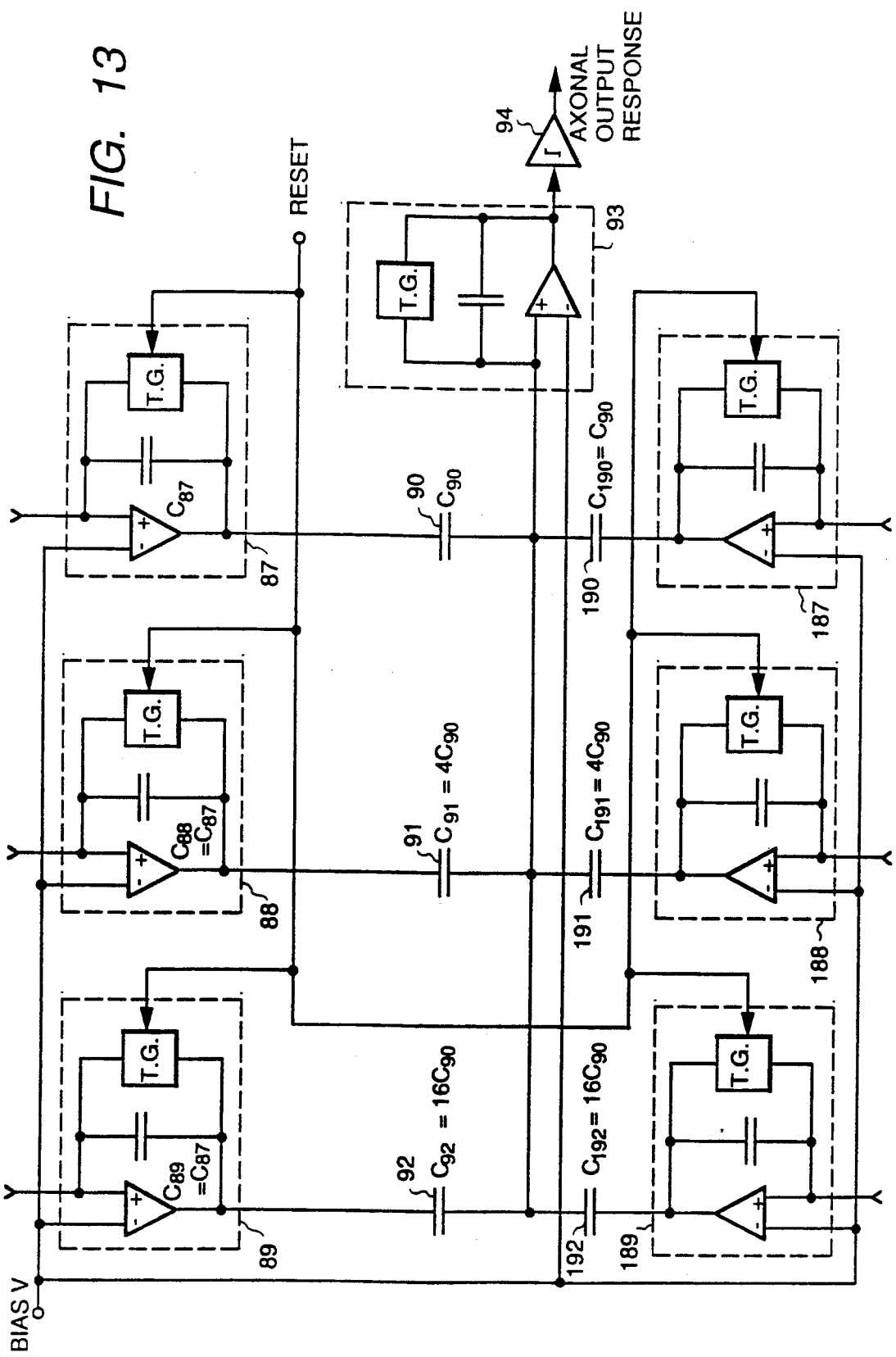
FIG. 13 is a schematic diagram of a means, as can be used in the FIG. 12 system modification, for performing weighted summation of the respective partial summation results as parallelly supplied for a plurality of digit slices, thereby to generate a final weighted summation result.

FIG. 13 shows a variant of the FIG. 10 means, as can be used in the FIG. 12 system, for performing weighted summation of the respective partial weighted summation results as parallelly supplied for a plurality of digit slices, thereby to generate a final weighted summation result. Partial summation results from weighted summers in the arrays 41, 42 and 43 are supplied from the output ports of integrators 87, 88 and 89 as in the FIG. 10 means for performing weighted summation. Additionally, partial summation results from weighted summers in the arrays 141, 142 and 143 are supplied from the output ports of integrators 187, 188 and 189. The Miller feedback capacitors of Miller integrators 187, 188 and 189 have respective capacitances $C_{187}$, $C_{188}$ and $C_{189}$ that are eight times as large as the respective capacitances $C_{87}$, $C_{88}$ and $C_{89}$ of the Miller feedback capacitors of Miller integrators 87, 88 and 89. This scales the voltage responses of integrators 187, 188 and 189 down eight times as compared to the voltage responses of integrators 87, 88 and 89. The capacitances $C_{190}$, $C_{191}$ and $C_{192}$ of capacitors 190, 191 and 193 respectively are the same as the capacitances $C_{90}$, $C_{91}$ and $C_{92}$ of capacitors 90, 91 and 93 respectively. So the partial weighted summation results as parallelly supplied from the integrators 187, 188 and 189 are weighted one-eighth as heavily as the partial weighted summation results as parallelly supplied from the integrators 87, 88 and 89 in determining the final weighted summation result from the integrator 93 of FIG. 13 to the non-linear processor 94 generating an axonal output response.

Figure 14:
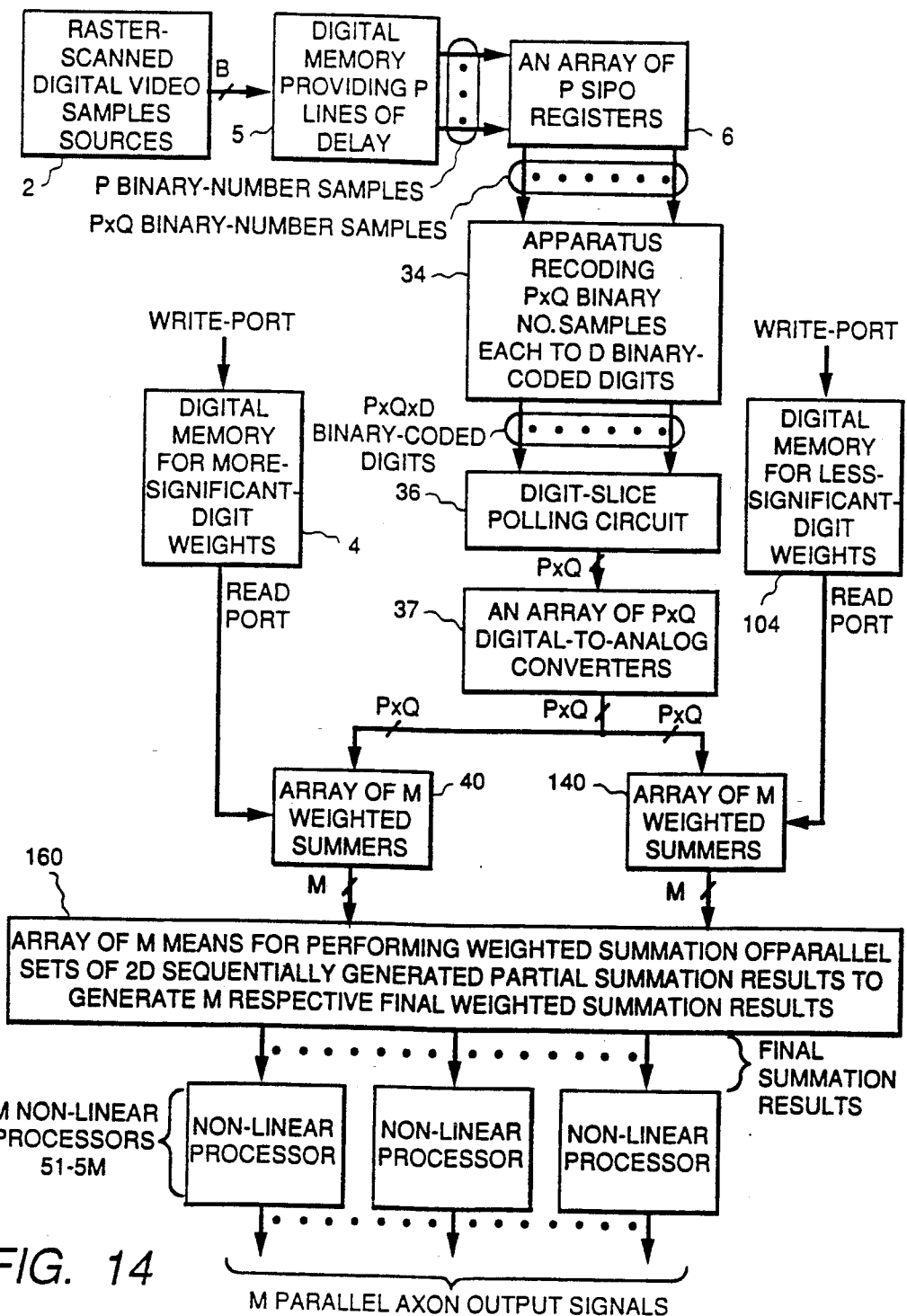
FIG. 14 is a schematic diagram of a variant of the FIG. 7 system in which the area taken up by weighting capacitors is reduced in accordance with the inventor's teaching in his U.S. patent application entitled "WEIGHTED SUMMATION CIRCUITS HAVING DIFFERENT-WEIGHT RANKS OF CAPACITIVE STRUCTURES".

FIG. 14 is a schematic diagram of a variant of the FIG. 7 system in which the area taken up by weighting capacitors is reduced in accordance with the inventor's teachings in his U.S. patent application entitled "WEIGHTED SUMMATION CIRCUITS HAVING DIFFERENT-WEIGHT RANKS OF CAPACITIVE STRUCTURES". The number D of digit slices is presumed to be three, and the weighting capacitors are presumed to be arranged in two ranks having respective significances of weighting in 8:1 ratio. The analog signals from the array 37 of P times Q digital-to analog converters in FIG. 14 are applied to the array 40 of weighted summers, M in number, having a pattern of weighting as established by the digital memory 4 for weights in accordance with the more significant digit slice of the complete pattern of weighting capacitor values. The analog signals from the array 37 of P times Q digital-to analog converters in FIG. 14 are also applied to an array 140 of weighted summers, M in number, having a pattern of weighting as established by a further digital memory 104 for weights in accordance with the less significant digit slice of the complete pattern of weighting capacitor values. FIG. 14 shows an array 160 of M means for performing weighted summation of 2D (here, by way of example, six) partial summation results each to generate M respective final weighted summation results to be non-linearly processed by non-linear processors 51-5M respectively to generate M axon output signals in parallel.

Figure 15:
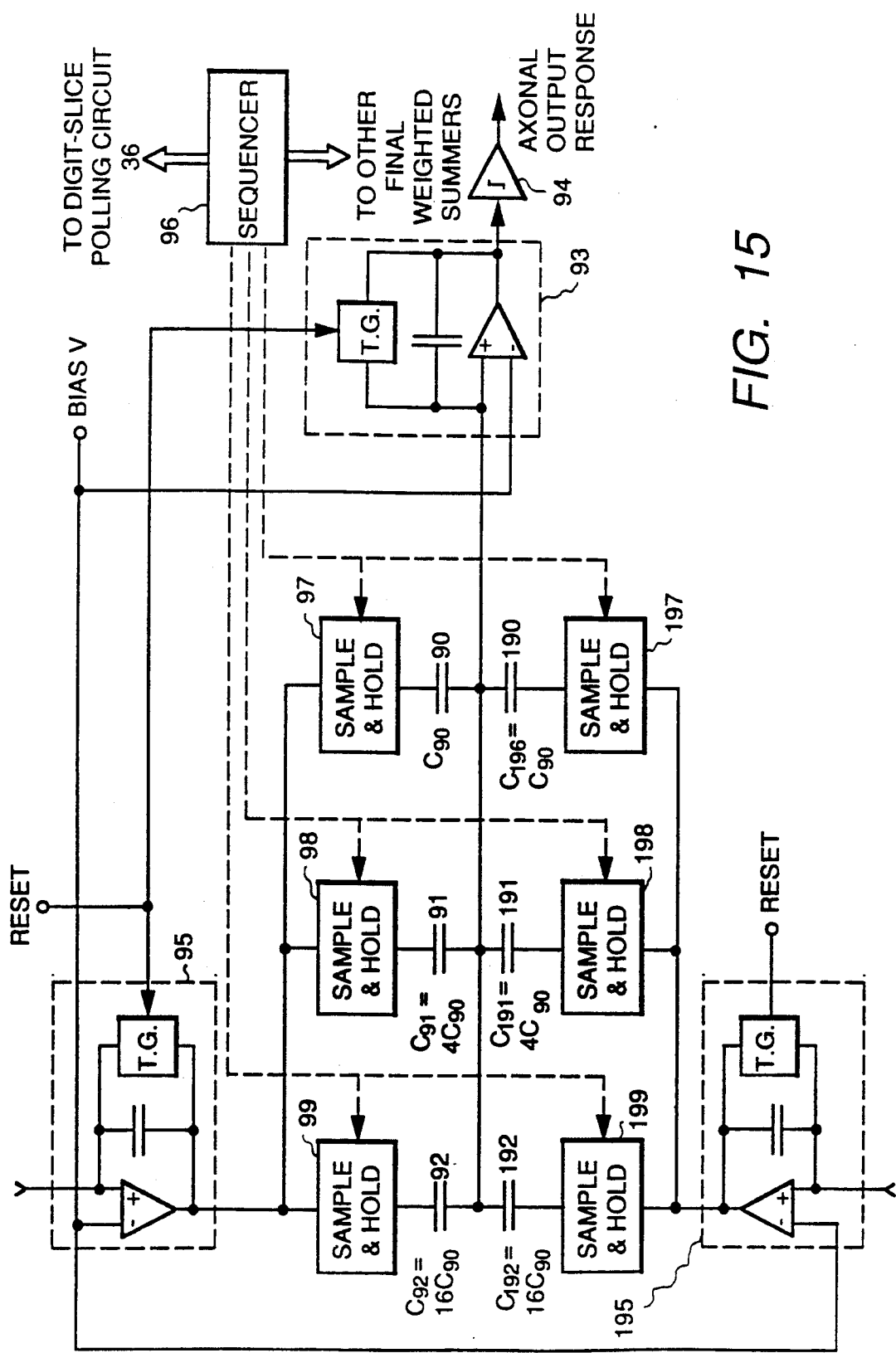
FIG. 15 is a schematic diagram of a means, as can be used in the FIG. 14 system, for performing weighted summation of the respective partial summation results as sequentially supplied for a plurality of digit slices, thereby to generate a final weighted summation result.

FIG. 15 shows a variant of the FIG. 11 means, as can be used in the FIG. 14 system, for performing weighted summation of the respective partial weighted summation results as supplied for a plurality of digit slices, thereby to generate a final weighted summation result. Partial summation results from a weighted summer in the array 40 are sequentially supplied from the output port of integrator 95 as in the FIG. 11 means for performing weighted summation. Additionally, partial summation results from a weighted summer in the array 140 are sequentially supplied from the output port of integrator 195. As controlled by the sequencer 96 sample-and-hold circuits 197, 198 and 199 sample integrator 195 output voltage at the same times as the sample-and-hold circuits 97, 98 and 99 respectively sample integrator 95 output voltage. The Miller feedback capacitor of Miller integrator 195 has a capacitance $C_{195}$ that is eight times as large as the capacitance $C_{95}$ of the Miller feedback capacitor of Miller integrator 95. This scales the voltage response of integrator 195 down eight times as compared to the voltage response of integrator 95. The capacitances $C_{190}$, $C_{191}$ and $C_{192}$ of capacitors 190, 191 and 193 respectively are the same as the capacitances $C_{90}$, $C_{91}$ and $C_{92}$ of capacitors 90, 91 and 93 respectively. So the partial weighted summation results as sequentially supplied from the integrator 195 are weighted one-eighth as heavily as the partial weighted summation results as sequentially supplied from the integrator 95 in determining the final weighted summation result from the integrator 93 of FIG. 15 to the non-linear processor 94 generating an axonal output response.

For the FIG. 13 and FIG. 15 means for performing weighted summation of the respective partial weighted summation results as supplied for a plurality of digit slices, as for those of FIGS. 10 and 11, there are variants using integrators of balanced rather than single-ended type. Using integrators of balanced rather than single-ended type involves somewhat more circuitry, but the balanced integrators advantageously provide common-mode rejection of switching noise from other, nearby circuitry.

Figure 16:
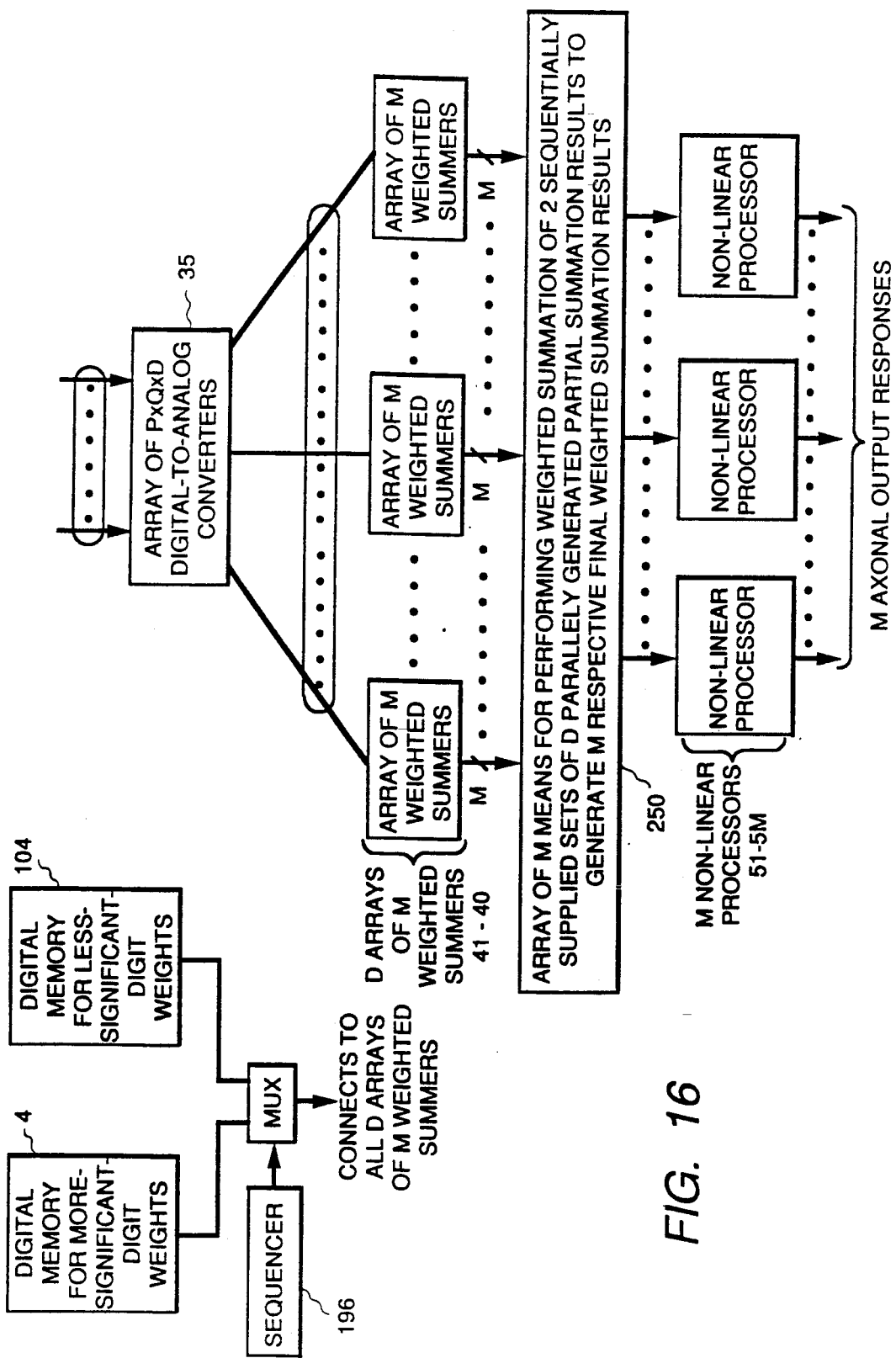
FIG. 16 is a schematic diagram of another modification that can be made to the FIG. 6 system to reduce the area taken up by weighting capacitors in accordance with the inventor's teachings in his U.S. patent application entitled "WEIGHTED SUMMATION CIRCUITS HAVING DIFFERENT-WEIGHT RANKS OF CAPACITIVE STRUCTURES".
Figure 17:
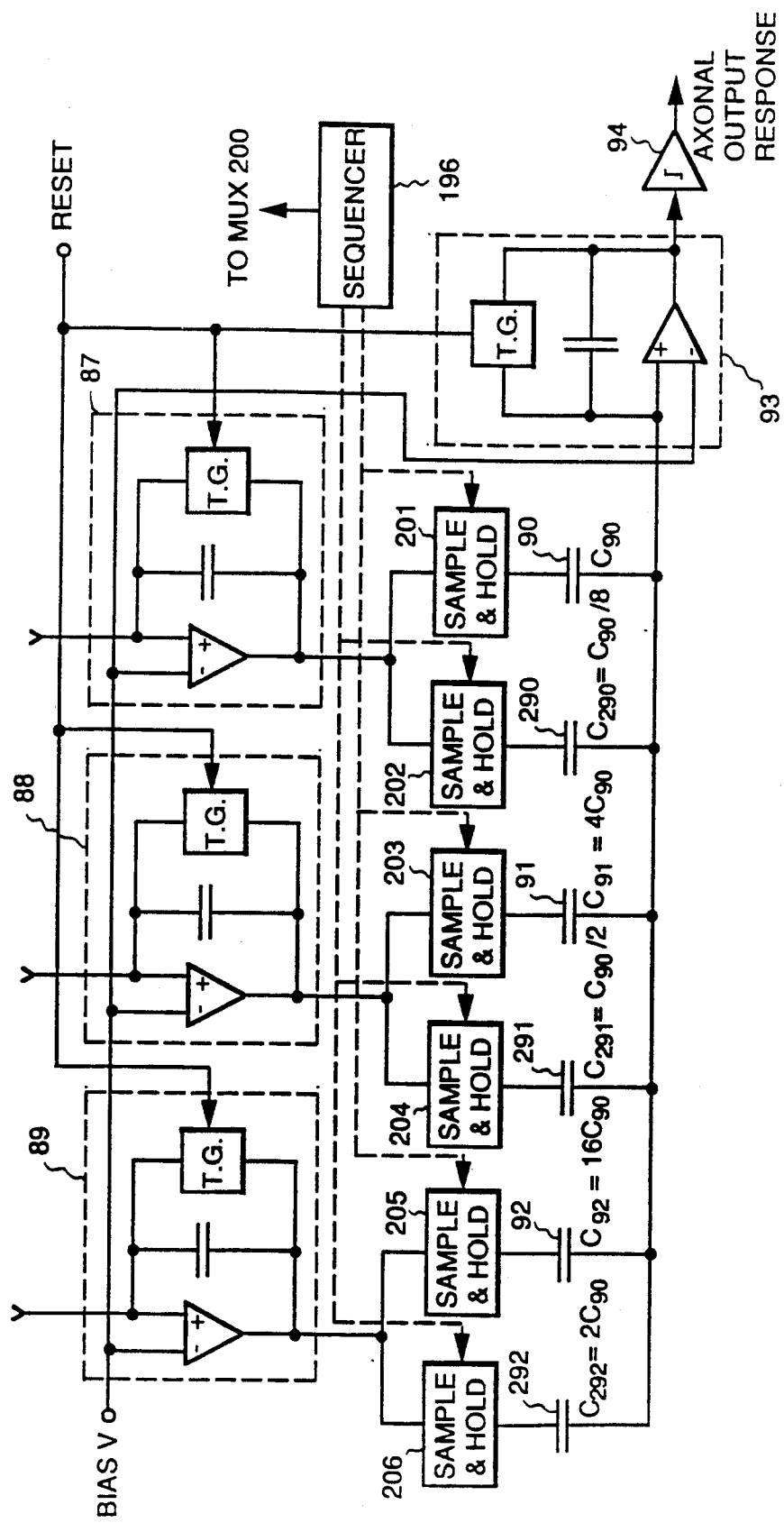
FIG. 17 is a schematic diagram of means for performing a weighted summation of the respective partial summation results in the FIG. 16 system, thereby to generate a final weighted summation result.
Figure 18:
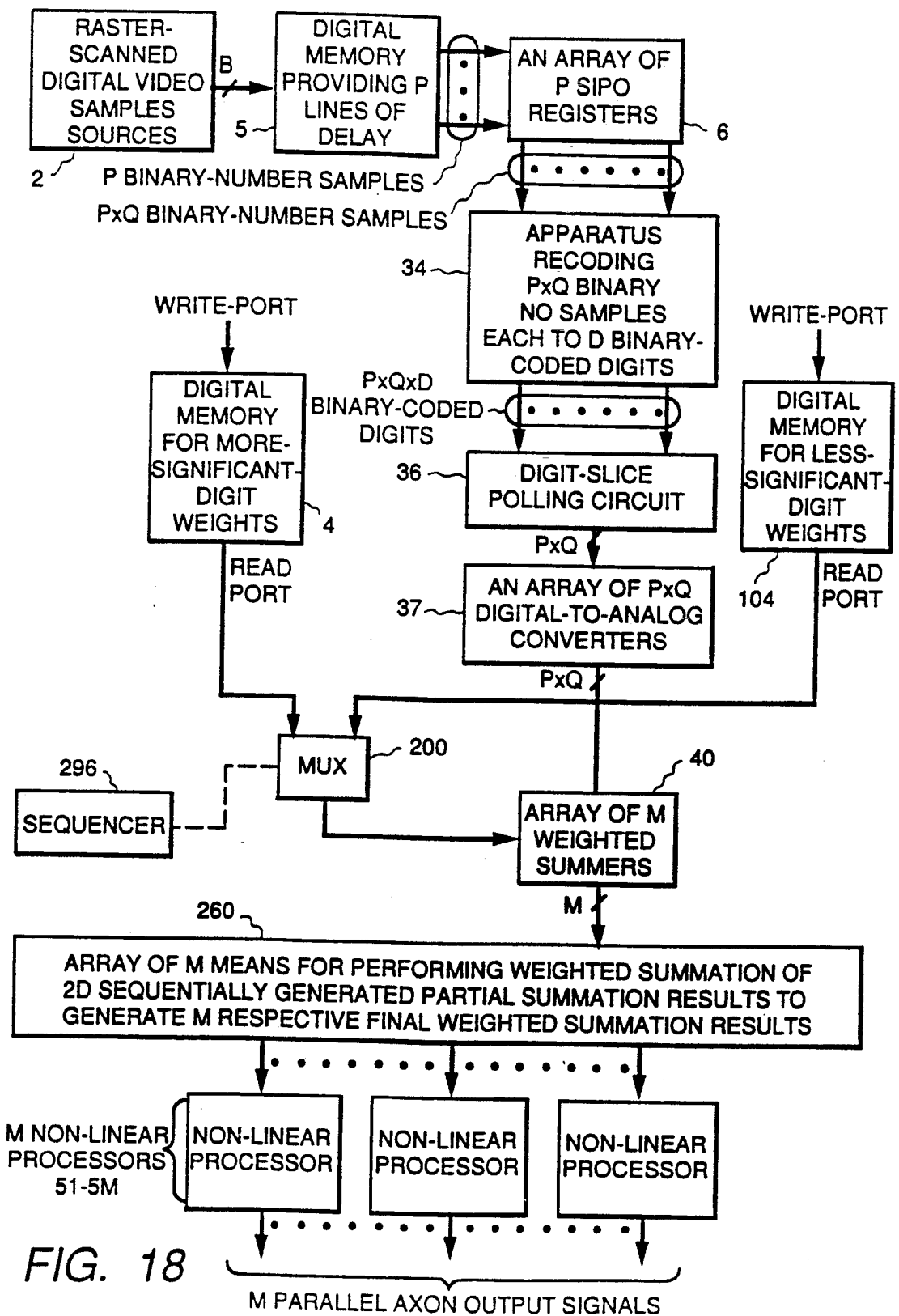
FIG. 18 is a schematic diagram of a variant of the FIG. 7 system in which the area taken up by weighting capacitors is reduced in accordance with the inventor's teachings in his U.S. patent application entitled "WEIGHTED SUMMATION CIRCUITS HAVING DIFFERENT-WEIGHT RANKS OF CAPACITIVE STRUCTURES".

Rather than processing the digit slices of the weighting capacitors in parallel as done in the FIG. 12 and 14 systems, alternatively, the processing of the digit slices of the weighting capacitors can be done sequentially in still further embodiments of the invention. FIGS. 16-18 concern such further embodiments of the invention.

FIG. 16 shows a modification of the FIG. 6 system that differs from the FIG. 12 modification of the FIG. 6 system in that only one array of M weighted summers per digit slice is used. These arrays 41-4D of M weighted summers have similar patterns of weighting as programmed by the one of the digital memories 4 and 104 selected by a multiplexer 200 under control of a sequencer 196. When processing each successive set of D groups of P times Q analog signals from the array 35 of digital-to-analog converters, the sequencer 196 initially causes the multiplexer 200 to select from digital memory 4 the more significant digit slice of the complete weighting words, then finally causes the multiplexer 200 to select from digital memory 104 the less significant digit slice of the complete weighting words.

The arrays 41-4D of M weighted summers sequentially supply two sets of D parallelly generated partial weighted summation results respectively to each of M means for performing a final weighted summation, which constitute the array 250 of such means.

FIG. 17 shows the integrators 87, 88 and 89 supplying the respective partial weighted summation results for three digits to a single one of the M means for performing a final weighted summation in array 250. When the sequencer 196 directs the multiplexer 200 to select from digital memory 4 the more significant digit slice of the complete weighting words, it causes sample-and-hold circuits 201, 203 and 205 to sample the partial weighted summation results then supplied from the integrators 87, 88 and 89. These partial weighted summation results are held and charge capacitors 90, 91 and 92. Thereafter, when the sequencer 196 directs the multiplexer 200 to select from digital memory 104 the less significant digit slice of the complete weighting words, it causes sample-and-hold circuits 202, 204 and 206 to sample the partial weighted summation results then supplied from the integrators 87, 88 and 89. These partial weighted summation results are held and charge capacitors 290, 291 and 292 which have respective capacitances $C_{290}$, $C_{291}$ and $C_{292}$ that are one-eighth as large as the respective capacitances $C_{90}$, $C_{91}$ and $C_{92}$ of the capacitors 90, 91 and 92. The integrator 93 accordingly weights the earlier-established and later-established sets of partial weighted summation results in 8:1 ratio in its response supplied to the non-linear processor 94 to generate an axonal output response.

FIG. 18 shows a variant of the FIG. 7 system that differs from the FIG. 14 variant of the FIG. 7 system in that only one array 40 of M weighted summers, rather than two, is used. The array 40 of M weighted summers has its pattern of weighting programmed by the one of the digital memories 4 and 104 selected by a multiplexer 200 under control of a sequencer 296. When processing each D successive groups of P times Q analog signals from the array 37 of digital-to-analog converters, the sequencer 296 initially causes the multiplexer 200 to select from digital memory 4 the more significant digit slice of the complete weighting words, then finally causes the multiplexer 200 to select from digital memory 104 the less significant digit slice of the complete weighting words. The array 40 of M weighted summers sequentially supplies two sets of D sequentially generated partial weighted summation results respectively to each of M means for performing a final weighted summation, which constitute the array 260 of such means.

Each of the M means for performing a final weighted summation in the array 260 is of the same general type as the FIG. 11 means for performing a final weighted summation, except for having besides capacitors 90, 91 and 92 capacitors 290, 291 and 292 charged from integrator 95 output voltage as sequentially sampled and held in respective sample-and-hold circuits after sequentially sampling and holding in sample-and-hold circuits 97, 98 and 99. The sequential sampling and holding is controlled by the sequencer 296.

Figure 19:
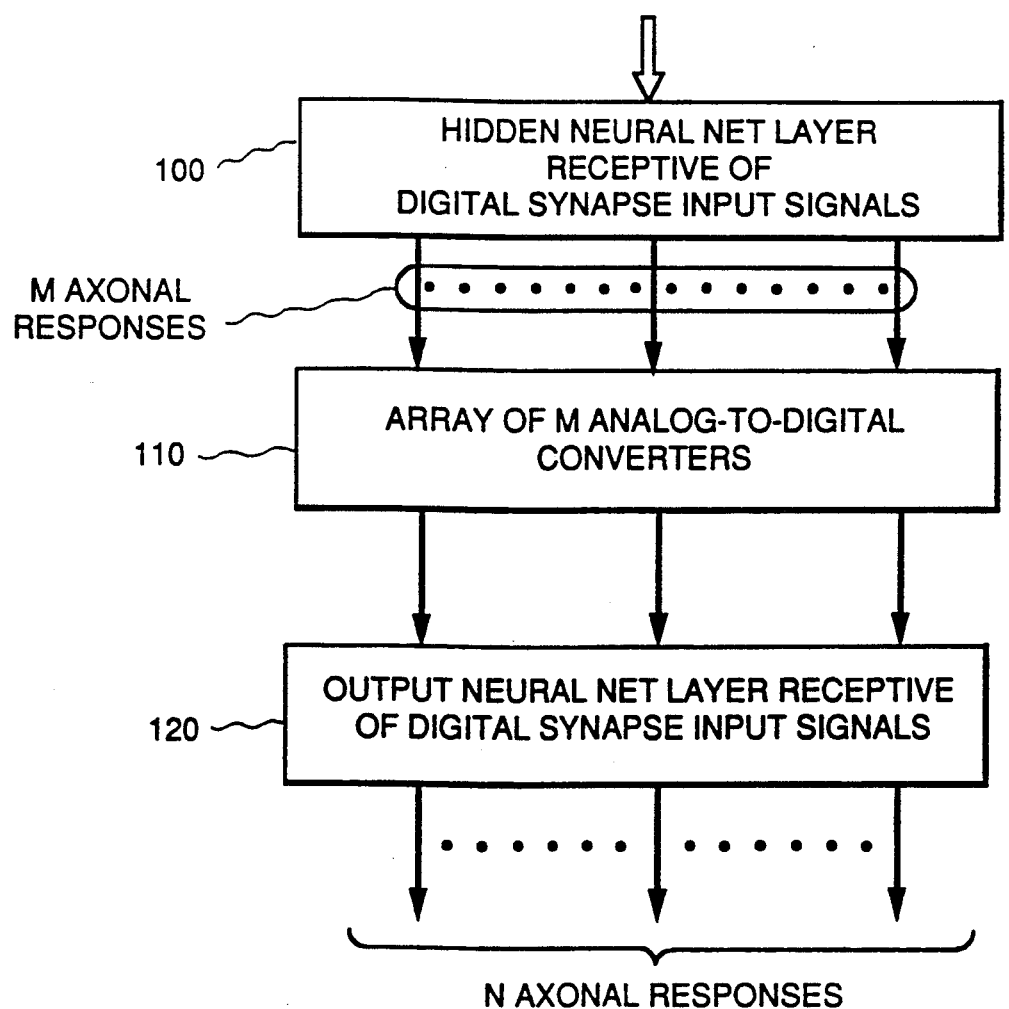
FIG. 19 is a schematic diagram of a neural net comprising a hidden neural net layer receptive of digital synapse input signals, analog-to-digital conversion circuitry for digitizing the analog axonal output responses of the hidden neural net layer and an output neural net layer receptive of the digitized axonal output responses of the hidden neural net layer as synapse input signals.

In the neural net shown in FIG. 19 a hidden neural net layer 100 receptive of digital synapse input signals, as described in connection with any of the lower-numbered figures, supplies its M axonal responses to an array 110 of analog-to-digital converters. A preferred type of analog-to-digital converter for use in the array 110 is an oversampling analog-to-digital converter of the so-called sigma-delta (or delta-sigma) type. This type of converter is simple in its structure and is particularly well suited for construction using metal-oxide-semiconductor devices, making it feasible for a substantial number of these analog-to-digital converters to be used in the array 110 and integrated within the same large-scale monolithic integrated circuit as the neural net layer used in generating the axonal responses for these analog-to-digital converters to convert. The sigma-delta type of converter inherently supplies its digital output signals in bit-serial format, so that fewer pins are taken up for interfacing to a subsequent monolithic integrated circuit. As shown in FIG. 19 such a subsequent monolithic integrated circuit can include an output neural net layer 120 receptive of digital synapse input signals, as described in connection with any of the lower-numbered figures. The sigma-delta type of converter also provides a wide range of trade-offs between resolution and conversion speed, which one may wish to exploit in adaptive systems with adjustable learning rates. In a variant of the FIG. 19 neural net, the interface between the monolithic integrated circuits on which the hidden neural net layer and the output neural net layer are respectively located may fall within the array 110 of sigma-delta analog-to-digital converters, so that the sigma-delta modulator portions of the converters are located on the same integrated circuit as the hidden neural net layer, but the decimation filters of the sigma-delta converters are located on the same integrated circuit as the output neural net layer.

Figure 20:
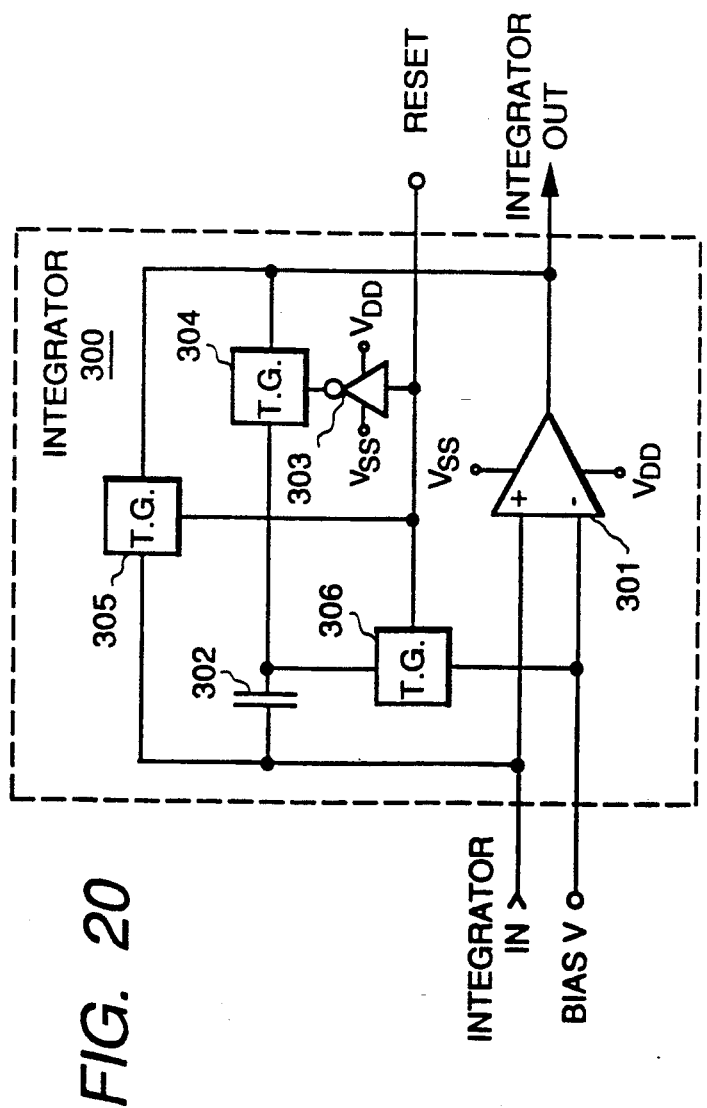

FIG. 20 shows an integrator 300 of a type that is preferably used instead of the simpler type exemplified by integrators 87, 88, 89 and 93 of FIGS. 10 and 13 and by integrator 93 of FIGS. 11, 15 and 17. The integrator 300 is a Miller integrator that includes a differential-input operational amplifier 301 having a Miller feedback capacitor 302 connecting from its output connection back to its inverting (−) input connection during normal operation. During normal charge-sensing operation a relatively low potential ($V_{DD}$) is applied via RESET terminal to a logic inverter 303 that responds to apply a relatively high potential ($V_{SS}$) to a transmission gate 304. The transmission gate 303 is rendered conductive to connect the output connection of operational amplifier 301 to capacitor 302 to complete its connection as Miller feedback capacitor. The relatively low potential applied via RESET terminal conditions a transmission gate 305 and a transmission gate 306 both to be non-conductive. The integrator 300 is preferred because differential input offset error in the operational amplifier 301 is compensated against, owing to the way the integrator 300 is reset.

During periodic reset intervals for the integrator 300 a relatively high potential ($V_{SS}$) is applied via RESET terminal to condition transmission gates 305 and 306 each to be conductive and to condition the logic inverter 303 output potential to go high, which renders transmission gate 304 non-conductive. The conduction of transmission gate 305 connects the output connection of operational amplifier 301 directly to its inverting (−) input connection, completing a feedback connection that forces the inverting (−) input connection to the differential input offset error voltage, which voltage by reason of transmission gate 306 being conductive is stored on the Miller capacitor 302. When normal charge-sensing operation is restored by RESET terminal going low, the differential input offset error bias remains stored on the Miller capacitor 302, compensating against its effect upon charge sensing.

One skilled in the art of designing large-scale integrated circuits, particularly ones using metal-oxide-semiconductor devices, and acquainted with the foregoing disclosure will be enabled to design a wide variety of analog weighted-summation and neural-net circuit interfacing with digital circuitry. This should be borne in mind when construing the scope of the claims which follow. The claim language calling for "apparatus for performing a number M of partial weighted summations in the analog regime of signal samples comprising each digit slice of said set of temporally aligned analog input signal samples, thereby to generate D respective sets of M partial weighted summation results: and apparatus for performing final weighted summations of the D corresponding partial weighted summations in said sets of M partial weighted summation results, thereby to generate M respective final weighted summation results" is to be construed broadly enough to include within its scope the weighted summation procedures wherein the capacitive weighting is digit-sliced, as described in connection with FIGS. 12–18.

What is claimed is:

1. A method for operating electronic apparatus for generating a weighted summation of digital input signals as manifested in electric signal form, each sample of said digital input signals having a plurality B in number of bits identified by respective ones of consecutive ordinal numbers first through $B^{th}$ assigned in order of decreasing significance, said method for operating electronic apparatus comprising the steps of:

supplying each of said digital input signals in a respective stream of samples of only that said digital input signal, such that there are corresponding samples of said digital input signals in each of said streams which corresponding samples are parallel in time with each other;

recoding each B-bit sample of said digital input signals into a plurality D in number of binary-coded digits, as manifested in electric signal form and as identified by consecutive ordinal numbers first through $D^{th}$ assigned in order of decreasing significance of weightings respectively assigned to the D binary-coded digits, B and D being respectively a relatively larger positive integer and a relatively smaller positive integer;

converting each set of temporally aligned digits to a set of corresponding analog electric signals consisting of D subsets each containing analog electric signals corresponding to digits of similar assigned weighting;

performing a weighted summation procedure on each of said D subsets of analog electric signals to obtain a respective partial weighted summation result manifested in electric signal form, thereby to generate streams of partial weighted summation results as manifested in electric signal form suitable for the next step of said method for generating a weighted summation of digital input signals; and performing a weighted summation procedure on corresponding samples of said streams of partial weighted summation results, thereby to obtain a stream of final weighted summation results as manifested in electric signal form.

2. A method as set forth in claim 1, wherein said step of converting each set of temporally aligned digits to a set of corresponding analog electric signals converts each set of temporally aligned digits to a set of corresponding analog electric signal voltages, and wherein said step of performing a weighted summation procedure on each of said D subsets of analog electric signals comprises the substeps of:

performing a plurality D in number of weighted summation procedures, one on each of said D subsets of analog electric signal voltages, using weighting capacitors in accordance with Coulomb's Law in each of said plurality D in number of weighted summation procedures in this substep, thereby to obtain a partial weighted summation result defined in terms of at least one quantity of electric charge for each of said plurality D in number of weighted summation procedures in this substep; and sensing each said quantity of electric charge to generate said streams of partial weighted summation results as manifested in electric signal form suitable for the final step of said method for generating a weighted summation of digital input signals.

3. A method as set forth in claim 2, wherein said partial weighted summation result obtained by said substep of sensing each said quantity of electric charge is manifested in analog electric signal form, and wherein said step of performing a weighted summation procedure on the streams of partial weighted summation results is carried out in the analog signal regime to obtain a stream of final weighted summation results manifested as a stream of analog electric signal samples.

4. A method as set forth in claim 3 including the further step of:

converting said stream of analog electric signal samples to a stream of digital electric signal samples.

5. A method for operating electronic apparatus for generating a weighted summation of digital input signals as manifested in electric signal form, each sample of said digital input signals having a plurality B in number of bits identified by respective ones of consecutive ordinal numbers first through $B^{th}$ assigned in order of decreasing significance, said method for operating electronic apparatus comprising the steps of:

supplying each of said digital input signals in a respective stream of samples of only that said digital input signal, such that there are corresponding samples of said digital input signals in each of said streams which corresponding samples are parallel in time with each other;

in accordance with a modified Booth encoding algorithm, recoding each B-bit sample of said digital input signals into a plurality D in number of binary-coded digits, as manifested in electric signal form and as identified by consecutive ordinal numbers first through $D^{th}$ assigned in order of decreasing significance of weightings respectively assigned to the D binary-coded digits, B and D being respectively a relatively larger positive integer and a relatively smaller positive integer;

converting each set of temporally aligned digits to a set of corresponding analog electric signals consisting of D subsets each containing analog electric signals corresponding to digits of similar assigned weighting;

performing a weighted summation procedure on each of said D subsets of analog electric signals to obtain a respective partial weighted summation result manifested in electric signal form, thereby to generate streams of partial weighted summation results as manifested in electric signal form suitable for the next step of said method for generating a weighted summation of digital input signals; and performing a weighted summation procedure on corresponding samples of said streams of partial weighted summation results, thereby to obtain a stream of final weighted summation results as manifested in electric signal form.

6. A method as set forth in claim 5, wherein said step of converting each set of temporally aligned digits to a set of corresponding analog electric signals converts each set of temporally aligned digits to a set of corresponding analog electric signal voltages, and wherein said step of performing a weighted summation procedure on each of said D subsets of analog electric signals comprises the substeps of:

performing a plurality D in number of weighted summation procedures, one on each of said D subsets of analog electric signal voltages, using weighting capacitors in accordance with Coulomb's Law in each of said plurality D in number of weighted summation procedures in this substep, thereby to obtain a partial weighted summation result defined in terms of at least one quantity of electric charge for each of said plurality D in number of weighted summation procedures in this substep; and sensing each said quantity of electric charge to generate said streams of partial weighted summation results as manifested in electric signal form suitable for the final step of said method for generating a weighted summation of digital input signals.

7. A method as set forth in claim 6, wherein said partial weighted summation result obtained by said substep of sensing each said quantity of electric charge is manifested in analog electric signal form, and wherein said step of performing a weighted summation procedure on the streams of partial weighted summation results is carried out in the analog signal regime to obtain a stream of final weighted summation results manifested as a stream of analog electric signal samples.

8. A method as set forth in claim 7 including the further step of:

converting said stream of analog electric signal samples to a stream of digital electric signal samples.

* * * * *